(12) United States Patent
Richardson et al.

(10) Patent No.: US 10,745,928 B2
(45) Date of Patent: Aug. 18, 2020

(54) CONNECTED VEHICLE LIFT AND STORAGE SYSTEM

(71) Applicant: CityLift Parking, LLC, Oakland, CA (US)

(72) Inventors: Brandon Michael Richardson, Dublin, CA (US); Yi Jack Cheng, Cypress, TX (US)

(73) Assignee: CityLift Parking, LLC, Oakland, CA (US)

( * ) Notice: Subject to any disclaimer, the term of this patent is extended or adjusted under 35 U.S.C. 154(b) by 191 days.

(21) Appl. No.: 15/890,712

(22) Filed: Feb. 7, 2018

(65) Prior Publication Data
US 2019/0242148 A1 Aug. 8, 2019

(51) Int. Cl.
| | | |
|---|---|---|
| G06F 7/00 | (2006.01) |
| E04H 6/42 | (2006.01) |
| E04H 6/22 | (2006.01) |
| G05D 3/20 | (2006.01) |
| H04W 4/40 | (2018.01) |
| H04W 8/18 | (2009.01) |
| H04W 4/02 | (2018.01) |
| G07C 9/32 | (2020.01) |

(52) U.S. Cl.
CPC ............. *E04H 6/424* (2013.01); *E04H 6/22* (2013.01); *G05D 3/20* (2013.01); *G07C 9/32* (2020.01); *H04W 4/023* (2013.01); *H04W 4/40* (2018.02); *H04W 8/18* (2013.01)

(58) Field of Classification Search
None
See application file for complete search history.

(56) References Cited

U.S. PATENT DOCUMENTS

| 4,674,938 A | 6/1987 | Stokes |
| 6,662,077 B2 * | 12/2003 | Haag ............... E04H 6/422 340/932.2 |
| 8,290,613 B2 | 10/2012 | Shani |

(Continued)

FOREIGN PATENT DOCUMENTS

| EP | 1828506 | 5/2010 |
| WO | WO-2004/027550 | 4/2004 |

OTHER PUBLICATIONS

International Search Report and The Written Opinion of The International Searching Authority dated May 23, 2019, for related PCT/US19/17125 filed Feb. 7, 2019, 10 pages.

*Primary Examiner* — Yolanda R Cumbess
(74) *Attorney, Agent, or Firm* — Mahamedi IP Law LLP

(57) ABSTRACT

A connected vehicle lift and storage system (VLSS) can include a plurality of platforms for storing vehicles that are movable between a plurality of positions. The connected VLSS can communicate with a computing device operated by a user to receive requests to store or retrieve the user's vehicle(s). As part of the request, location data generated by the computing device can be transmitted to the connected VLSS. In response to the request, the connected VLSS can determine a sequence of platform movements to fulfill the request to store or retrieve the user's vehicle(s). The sequence can be determined, at least in part, on the location data of the requesting user and/or the location data of other users. In addition, the sequence can be determined to minimize wait times for the requesting user and other users.

20 Claims, 10 Drawing Sheets

(56) References Cited

U.S. PATENT DOCUMENTS

| | | |
|---|---|---|
| 8,584,800 B2 | 11/2013 | Bowden |
| 9,581,997 B1 * | 2/2017 | Penilla .................. B60W 30/08 |
| 2003/0069665 A1 | 4/2003 | Haag |
| 2004/0254840 A1 | 12/2004 | Slemmer |
| 2011/0182703 A1 * | 7/2011 | Alan ........................ E04H 6/183 |
| | | 414/231 |
| 2012/0323643 A1 | 12/2012 | Volz |
| 2013/0183123 A1 | 7/2013 | Meiners |
| 2013/0322993 A1 | 12/2013 | Farid |
| 2014/0294543 A1 | 10/2014 | Jarvinen |
| 2014/0302875 A1 * | 10/2014 | Beaurepaire ........... G08G 1/143 |
| | | 455/456.3 |
| 2016/0251867 A1 | 9/2016 | Cifelli |
| 2017/0029244 A1 | 2/2017 | Madarasz |
| 2017/0061508 A1 | 3/2017 | Sen |
| 2017/0092130 A1 * | 3/2017 | Bostick .................. G08G 1/143 |
| 2017/0351975 A1 | 12/2017 | Webb |
| 2018/0150773 A1 | 5/2018 | Lee |
| 2018/0247103 A1 | 8/2018 | Hsu |
| 2018/0268322 A1 | 9/2018 | Liu |
| 2019/0035274 A1 | 1/2019 | Sabagh |
| 2019/0168993 A1 | 6/2019 | Kuenzi |

* cited by examiner

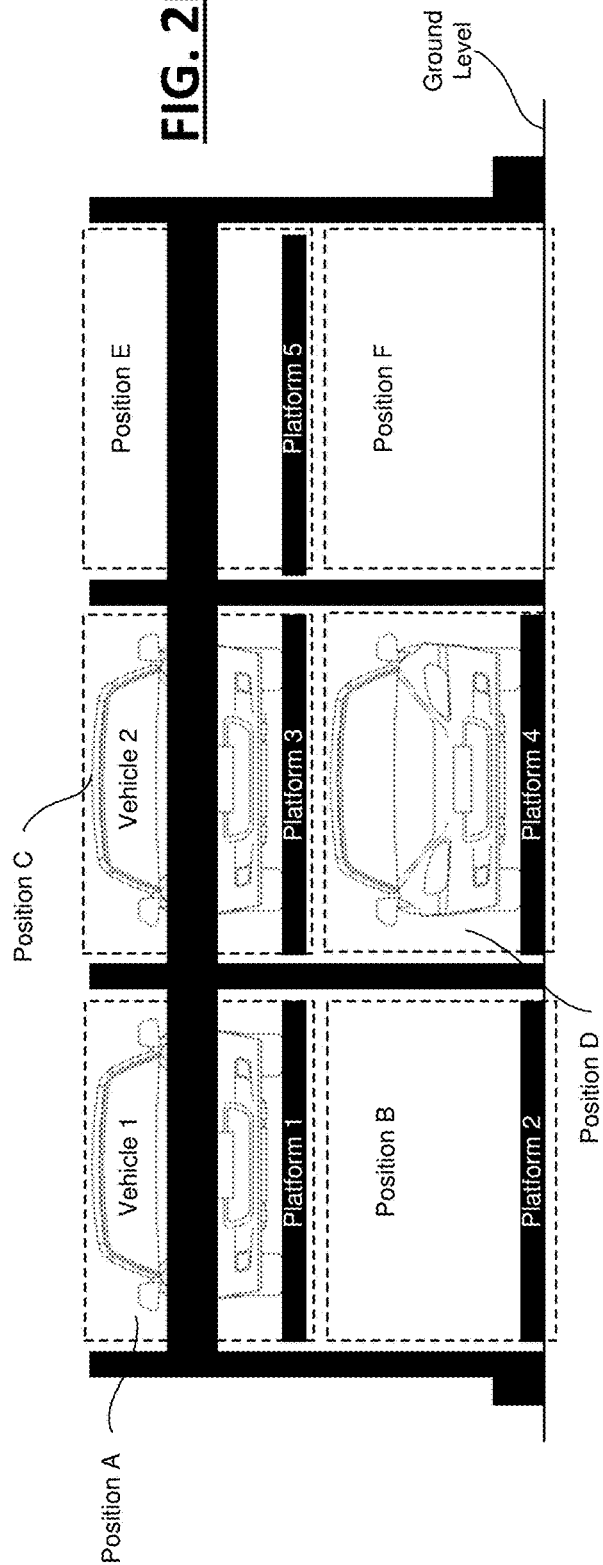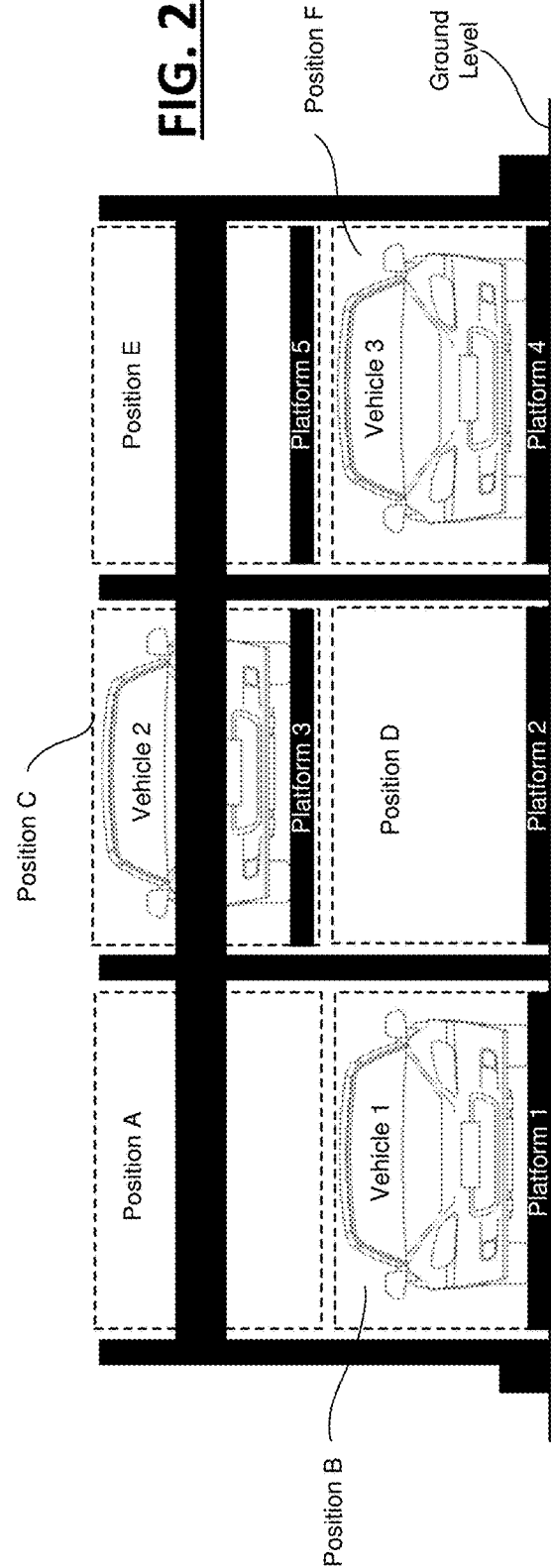

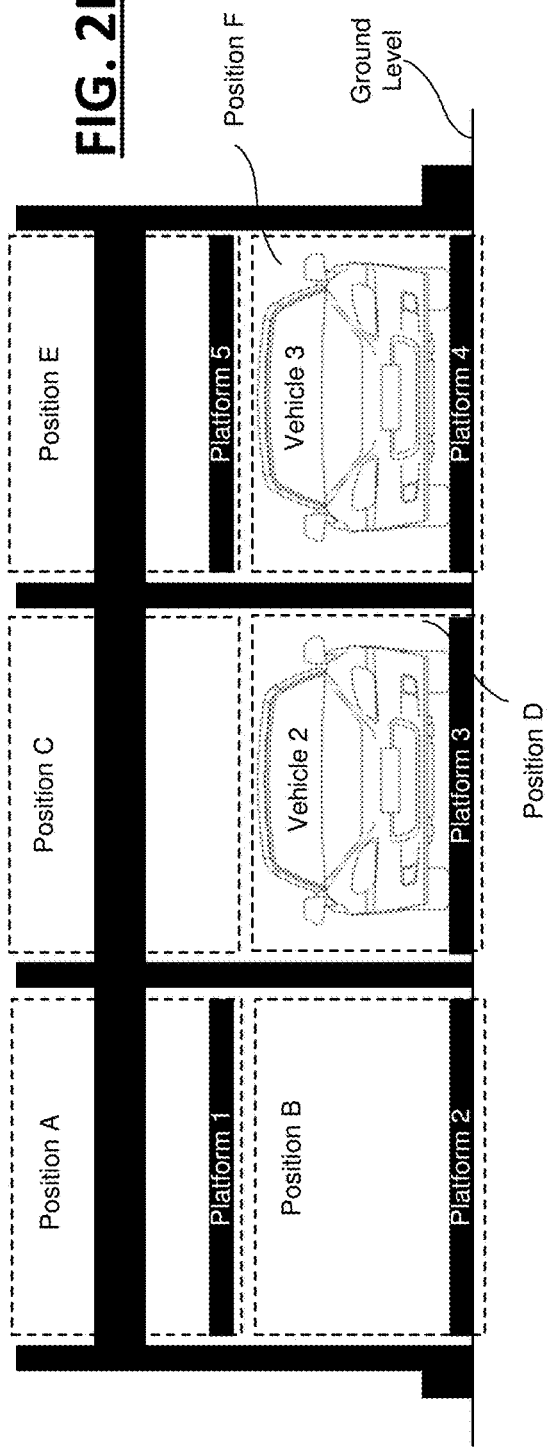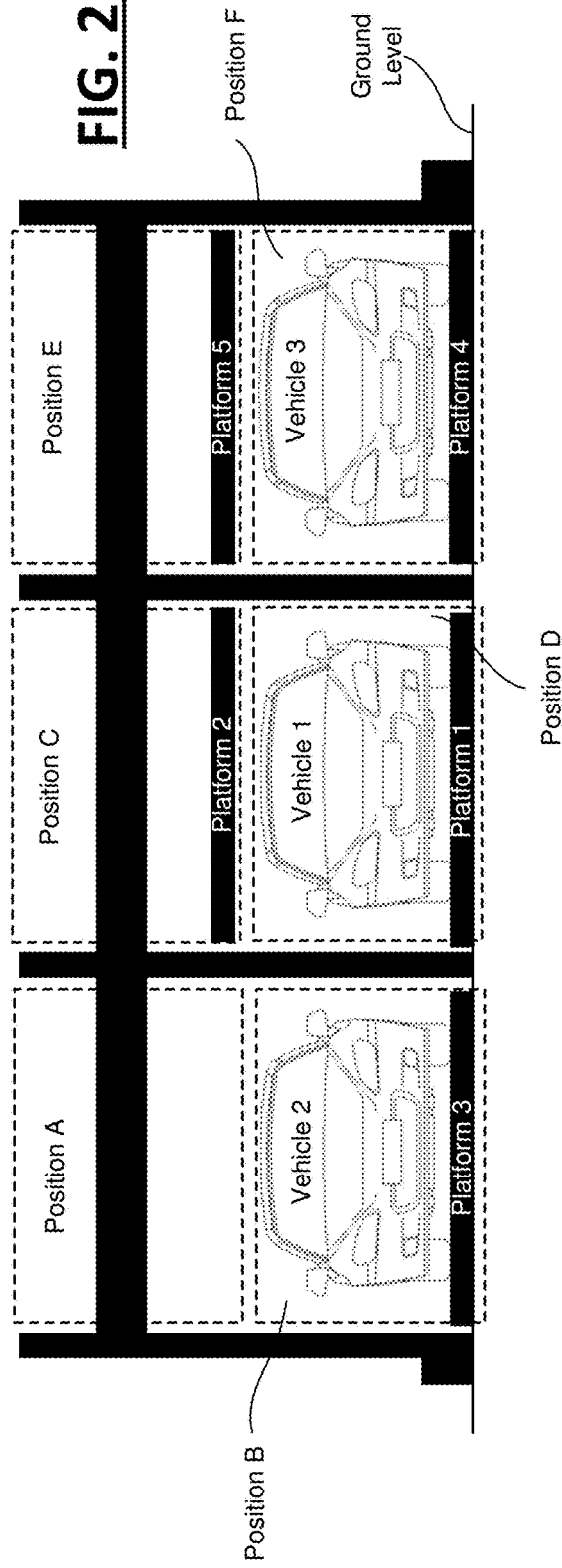

CONNECTED VEHICLE LIFT AND STORAGE SYSTEM

BACKGROUND

Vehicle storage systems can be used to store multiple vehicles in a limited amount of real estate. Vehicle storage systems can, for example, store vehicles by stacking the vehicles vertically and thus providing additional storage for vehicles in a given amount of real estate.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 2B to 2E illustrate front views of an exemplary vehicle lift being configured in accordance with a 3×2 Puzzle VLSS Configuration, in accordance with examples described herein;

DETAILED DESCRIPTION

Figure 1:
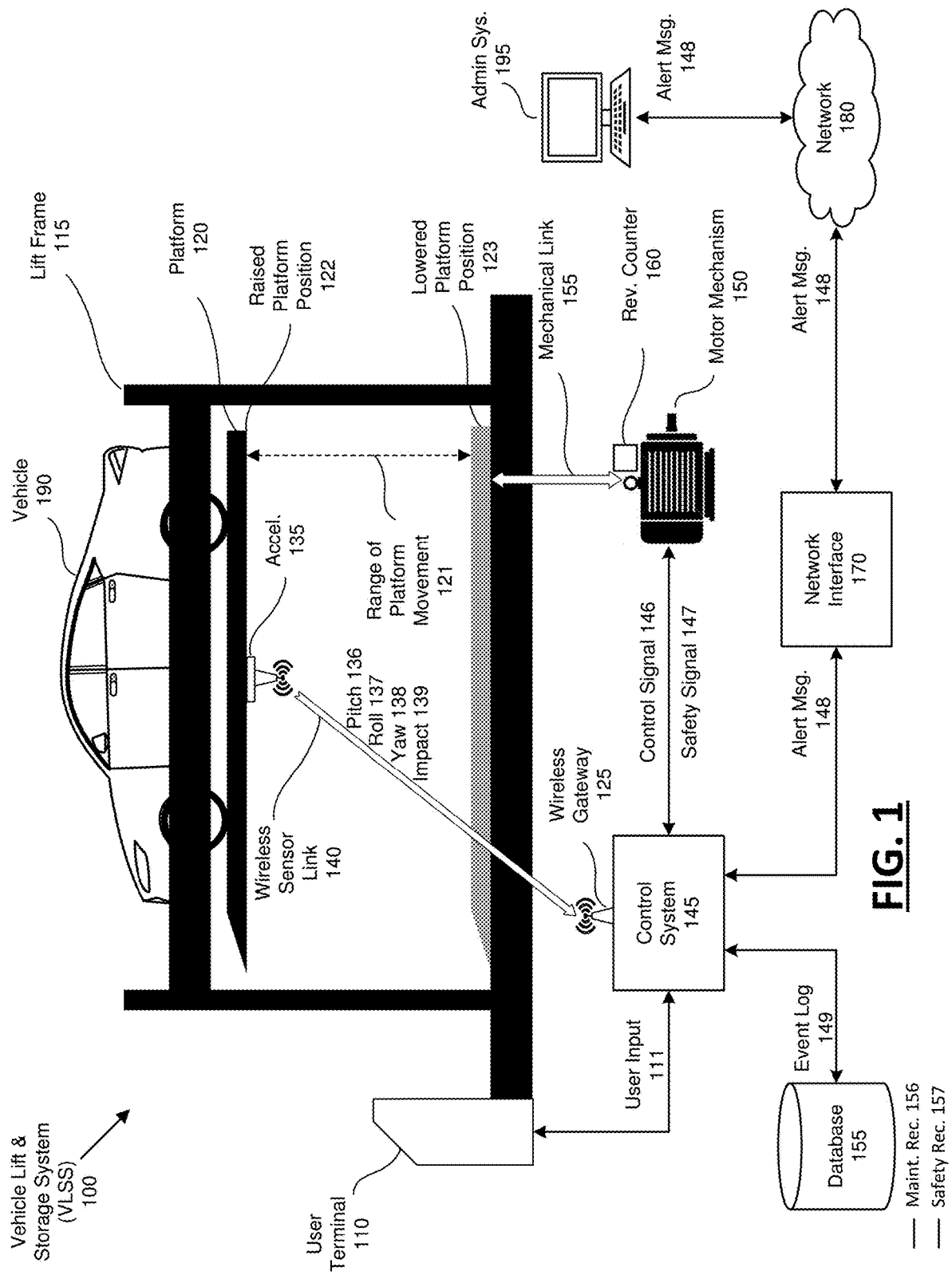
FIG. 1 is a block figure diagram illustrating an example vehicle lift and storage system (VLSS) utilizing a multi-axis accelerometer, in accordance with examples described herein.

Examples described herein provide for a vehicle lift and storage system ("VLSS") that comprise one or more platforms for supporting and/or storing vehicles. The platforms are movable between a plurality of positions to allow vehicles to access the VLSS via one or more vehicular access positions. For example, a platform can be moved to a vehicular access position of a VLSS and the vehicle can enter the VLSS and onto the platform via the vehicular access position. Subsequently, the platform can be moved to another position to store the vehicle in the VLSS. To retrieve the vehicle, the platform supporting the vehicle can be moved to the vehicular access position and the vehicle can drive off the platform and out of the VLSS. Depending on the specific implementation, the platforms can be moved vertically and/or horizontally. The VLSS can also include one or more moving mechanisms operatively connected to the platforms for moving the platforms between the plurality of positions. The moving mechanisms can be electromechanical motors that move the platforms (e.g., vertically, horizontally, or both) via mechanical chain links. The VLSS can be equipped with a control system that controls the moving mechanisms. In certain implementations, the control system can determine a sequence for moving the platforms such that vehicles can be stored in and retrieved from the VLSS. The sequence for moving the platforms can be optimized by the control system based on a variety of parameters (e.g., user location data etc.) to minimize wait times of users in storing and retrieving their vehicles from the VLSS.

As contemplated herein, the VLSS can be configured in accordance with a plurality of types of configurations. In a simple example of a VLSS, a platform of a VLSS is movable between a lower position and an upper position. When the platform is in the lower position, a vehicle can access the platform and drive onto the platform. The platform can then be moved to the upper position, which allows at least one additional vehicle to be stored below the platform. In more complex examples, the VLSS can include a plurality of platforms that are movable between a plurality of positions. In some implementations, the platforms are movable both vertically and/or horizontally (relative to the ground) between a plurality of positions within the VLSS. For instance, in a type of configuration referred to herein as a "Puzzle VLSS," platforms can be moved vertically and horizontally to allow for vehicle storage and retrieval operations. In an example 3×2 Puzzle VLSS, five platforms are movable between six positions in the VLSS. The six positions in the VLSS can be arranged in two vertical layers, each having three positions. The five platforms of the 3×2 Puzzle VLSS can be moved to any of the six positions and vehicles can access the VLSS by driving onto an open platform positioned in the lower layer. By arranging the platforms in this manner and enabling them to move vertically and horizontally, vehicles stored on the upper level of the 3×2 Puzzle VLSS can be retrieved without needing to remove any of the vehicles stored on the non-bottom layers. The 3×2 Puzzle VLSS can also be configured such that the top layer of positions within the VLSS are vehicular access positions. In a Puzzle VLSS, a platform is typically moved one position at a time between platform positions. Another type of configuration, referred to herein as a "Tower VLSS," can comprise a plurality of platforms which are movable between a plurality of storage positions and one or more vehicular access positions. In a Tower VLSS configuration, the platforms can be moved directly from a vehicular access position to any of the storage positions within the VLSS. A shaft extending the height of the Tower VLSS can be used to move platforms (and vehicles) directly from a vehicular access position (e.g., entrance to the Tower VLSS on the ground floor) to any storage position (e.g., a position for platforms storing vehicles 6 layers above the entrance). One application of a Tower VLSS configuration can be a dedicated parking structure. In the below discussions, examples may be described with respect to a certain configuration of VLSS (e.g., Tower VLSS, Puzzle VLSS, etc.), such discussions are not intended to be limited to any particular VLSS configuration but are rather intended to be generally applicable to any potential VLSS configuration.

According to embodiments, a network system can provide a cloud or network service for managing one or more aspects of a plurality of VLSS's. The network system can be connectively coupled to the VLSS's via one or more networks (e.g., the Internet). And the plurality of VLSS's can be geographically dispersed (e.g., located at various locations). At a high level, the network system can communicate with the VLSS's to, for example, identify users, assign spaces for users' vehicles, communicate with users regarding updates or service details, process payments, and manage the maintenance and operation of the VLSS's. The network system can maintain user profiles to enable users to have a consistent and seamless experience across all the VLSS's managed by the service platform. A user profile can store information regarding or related to the corresponding user, including, for example, payment information, vehicle information, usage history, permanent space allocation(s) at particular VLSS's (if any), etc. For instance, a user can utilize a single form of identification (e.g., a wireless key fob, a contactless card, a computing device executing a user application, etc.) to access and reserve spaces at several (or all) of the VLSS's managed by the cloud or network service.

According to embodiments, the network system can further maintain dynamically-updated availability information for each of the plurality of VLSS's it manages. By maintaining such availability information, the network system can dynamically assign or allocate spaces for users at any of the plurality of VLSS's in response to user requests to store vehicles at various locations. According to certain implementations, the availability information can simply indicate, for each VLSS, a number of open (e.g., unassigned and/or unreserved, etc.) spaces available for storing vehicles. In other implementations, the availability information can include additional more detailed information such as maintenance information, user information, etc.

In various examples, a VLSS can include a plurality of sensors. The output of the sensors can be used by the control system to generate control signals to control the moving mechanisms. For example, the sensors can detect that a platform has moved in place into a position allocated by the control system (e.g., in accordance with the sequence determined by the control system). In response, the control system can halt operations of the moving mechanisms for the platform. In addition, the sensors can detect for safety events such as a moving platform making unexpected contact with, for example, an open car door. In response, the control system can cause the platform to stop moving and return to its original/starting position to avoid damage to the platform, the vehicle on the platform, and the object the platform came in contact with. Furthermore, the sensors can detect if a component of the VLSS is malfunctioning (e.g., electromechanical motor, mechanical chain link, etc.).

According to embodiments, the sensors utilized by the VLSS can include accelerometers placed on the platforms. Each platform of the VLSS can include an accelerometer and the control system can receive the accelerometer output to generate control signals and/or safety signals to control the moving mechanisms in moving the platforms. The accelerometer can be a multi-axis accelerometer that is able to detect the pitch, roll, and yaw of the platform on which it is placed. The accelerometer output can further indicate that the platform has made impact with the frame of the VLSS or the ground (e.g., as the platform moves into the desired position) or with another object (e.g., an open door with another vehicle). In certain implementations, a single accelerometer can be used for a given platform of the VLSS, replacing a plurality of other sensors that would have been used for the same purposes (e.g., detecting platform impact and safety events). Thus, among other benefits, the use of a multi-axis accelerometer decreases the complexity and costs of building the VLSS by reducing the number of sensors required to ensure safe operations in moving the platforms of the VLSS.

In various implementations, the control system can monitor the output of an accelerometer of a given platform to detect for safety events associated with the given platform. Examples of safety events that can be detected by the control system based on the accelerometer output include the platform (or the vehicle on the platform) making undesired or unexpected contact with another object while the platform is being moved, a failure of a moving mechanism or a mechanical link, or a unexpected movement of the platform while the platform being maintained in place. As one example, a safety event can be detected based on the monitored output from the accelerometer indicating that a pitch rotation, a roll rotation, and/or a yaw rotation of the platform is above a certain threshold value. Such an output from the accelerometer can indicate an impact while the platform is being moved such that the platform experiences a rotation or tilt. As one example, the door of a vehicle being stored on the platform may be ajar or open. As the platform is being lowered, for example, the vehicle's door may make contact with another platform or another vehicle being stored in the VLSS, causing the moving platform to experience a rotation or tilt. As another example, while being lowered or raised, the platform can impact an object on one side, also causing the moving platform to experience a rotation or tilt. In response to detecting of such safety events, the control system can be configured to generate a safety signal to cause the moving mechanism to cease attempting to bring the platform to from its initial position to the desired position to prevent damage to the platform, the vehicle on the platform (e.g., to prevent the platform from tilting such that the vehicle falls off the platform), and the object with which impact is made (e.g., another platform or another vehicle). In some examples, the moving mechanism can further, in response to the safety event signal, move the platform back to its initial position (or to another safe position). Furthermore, the output from the accelerometer that indicate a pitch, roll, or yaw of the platform exceeding a threshold value can indicate that one or more mechanical links of the platform have failed. The control system can detect such a safety event and, in response, take corrective actions.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block figure diagram illustrating an example vehicle lift and storage system (VLSS) utilizing a multi-axis accelerometer, in accordance with examples described herein. As illustrated, the VLSS 100 can be a Puzzle VLSS that includes a plurality of platforms that can be moved both horizontally and vertically to allow for vehicle storage and retrieval. As FIG. 1 illustrates a sideways view of the VLSS 100, only vertical movements of its platform(s) are illustrated. Alternatively, VLSS 100 can also be a simple two-level vehicle lift in which the platforms move vertically.

According to embodiments, the VLSS 100 can include a platform 120 for supporting a vehicle 190. The platform 120 can be moved vertically through a range of movement 121 between a raised position 122 and a lowered position 123. In certain examples, the platform 120 may also be moved horizontally (not shown in FIG. 1) while in either the raised position 122 or the lowered position 123. The VLSS further includes a control system 145 that controls a motor mechanism 150 to move the platform 120 between the raised position 122 and the lowered position. The platform 120 is operatively coupled to the motor mechanism 150 via a mechanical link 155. The motor mechanism 150 can be an electromechanical motor and the mechanical link 155 can be a chain link. The vehicle 190 may be driven onto the platform 120 while the platform 120 is in the lowered position 123. The platform 120 can be raised to the raised position 122 to allow an additional vehicle to be stored underneath the platform 120.

To operate the VLSS 100, a user may interact with the VLSS 100 via a user terminal 110. The user terminal 110 can be a computing device (e.g., a touchscreen computer, a tablet computer, etc.) presenting a user interface which enables the user to initiate vehicle storage or vehicle retrieval operations. For example, to store the vehicle 190 on the VLSS 100, the user can, after driving vehicle 190 onto the platform 120 while it is in the lowered position 123, interact with the user terminal 110 to instruct the VLSS 100 to store the vehicle 190, which may include moving the platform 120 to the raised position 122. Similarly, to retrieve the vehicle 190, the user can interact with the user terminal 110 to instruct the VLSS 100 to lower the platform 120 if it is in the raised position 122 such that the vehicle 190 can be driven off the platform 120. In certain examples, such as in a Puzzle VLSS configuration having a plurality of platforms, the user can provide identification and/or authentication information (e.g., a user ID, an authorization code, etc.) via the user interface to enable the VLSS 100 to identify the platform 120 that stores the user's vehicle 190 in order move the appropriate platform 120 to the lowered position 123 such that the vehicle 190 can be retrieved from the VLSS 100. As an alternative or in addition, the user may utilize a wireless key fob to interact with the user terminal 110 and/or the VLSS 100 to store and retrieve the vehicle 190. Furthermore, the VLSS 100 may allow user interactions via a user application executed on a computing device operated by the user (e.g., a smartphone, a smartwatch, a tablet computer, etc.). For example, via the user application, the user can instruct the VLSS 100 to store or retrieve vehicle 190. The VLSS 100 may communicate with the computing device via one or more networks 180 such as the Internet or one or more local network connections (e.g., a local or peer-to-peer Wi-Fi connection, Bluetooth, etc.).

According to embodiments, the user terminal 110 can transmit user input 111 to the control system 145. The user input 111 can identify the user and the requested operation (e.g., vehicle storage or vehicle retrieval). For a requested vehicle storage operation, the user input 111 can further identify the platform (e.g., platform 120) on which the vehicle 190 of the user is located. In response, the control system 145 can associate the identified platform with the user such that the appropriate platform can be identified when the user requests retrieval of his or her vehicle 190. As an alternative, the control system 145 can automatically associate a platform with a user during a vehicle storage operation based on sensor outputs (e.g., output from an accelerometer 135 attached to the platform 120). For example, the control system 145 can determine, based on the sensor output, that a vehicle has been driven onto platform 120. In response, the control system 145 can automatically associate the platform 120 with the next vehicle storage operation request. In contrast, for a requested vehicle retrieval operation, in response to user input 111, the control system 145 can identify the platform associated with the user (e.g., platform storing the user's vehicle 190) and determine a sequence of platform movements to allow the user to retrieve his or her vehicle 190. For instance, the control system 145 can determine a sequence of platform movements to move the platform 120 that stores the user's vehicle 190 to the lowered position 123 such that the user can retrieve vehicle 190.

Various sensors can be utilized to enable the control system 145 to properly control the motor mechanism 150 in moving the platform 120 between the raised position 122 and the lowered position 123. For instance, based on the sensors' output, the control system 145 can generate a control signal 146 to control the motor mechanism 150 in moving the platform 120. The control system 145 can detect potential safety issues associated with the platform 120 based on the sensors' output and can generate a safety signal 147 in response. According to embodiments, the sensors can include an accelerometer 135 attached to the platform 120. In one example, the accelerometer 135 is attached underneath the platform 120 and located at the midpoint of the bottom surface of the platform 120. In other examples, the accelerometer 135 can be located elsewhere on the platform 120. The accelerometer 135 can be a multi-axis accelerometer that can detect the movement, impact, and orientation of the platform 120. For instance, the accelerometer 135 can detect the pitch, roll, and yaw of the platform 120. The accelerometer 135 can also detect an impact experienced by the platform 120 (e.g., another object impacting the platform 120, the platform 120 impacting another object as it moves from one position to another, the vehicle 190 impacting another object as the platform moves from one position to another etc.).

In some examples, the accelerometer 135 can be a wireless, battery-operated sensor device. The accelerometer 135 can communicate with the control system 145 via a wireless gateway 125 of the control system 145 over a wireless sensor link 140. The accelerometer 135 can transmit, over the wireless sensor link 140, various data related to the platform 120 to the control system 145. The data can include a pitch rotation 136 of the platform 120, a roll rotation 137 of the platform, a yaw rotation 138 of the platform 120, and an indication of an impact 139 experienced by the platform 120. The accelerometer 135 can be configured to operate in a manner to prolong or maximize its battery life. For instance, the accelerometer 135 can be configured to transmit data over the wireless sensor link 140 only when movement is detected by the accelerometer 135. In addition, while the platform 120 is stationary, the accelerometer 135 can enter a standby mode and/or temporarily disable the wireless sensor link 140 to conserve energy usage.

In various aspects, the controls system 145 can generate a control signal 146 to control the motor mechanism 150 operations in moving the platform 120 (e.g., via the mechanical link 155). As an example, the control system 145 can, in response to the user input 111 or another signal indicating a request for vehicle retrieval or storage operations, determine to move platform 120 from the raised position 122 to the lowered position 123. Based on this determination, the control system 145 can generate a corresponding control signal 146. In certain implementations, the control signal 146 can cause the motor mechanism 150 to move the platform 120 a predetermined distance from its initial position (e.g., the raised position 122) to a desired position (e.g., the lowered position 123). For instance, the control signal 146 can cause the motor mechanism 150 to operate a calibrated number of revolutions to cause the platform 120 to move from the raised position 122 to the lowered position 122. The control system 145 can look up, in a database or a memory storage element, the calibrated number of revolutions needed to move the platform 120 from the raised position 122 to the lowered position 123. The control system 145 can then generate the control signal 146 to cause the motor mechanism 150 to operate the calibrated number of revolutions (e.g., as measured by the revolution counter 160) in order to move the platform 120 from the raised position 122 to the lowered position 123.

In certain implementations, the motor mechanism 150 and/or the mechanical link 155 can be coupled to an instrument for measuring or estimating the amount of distance the platform 120 has traveled while being moved into the desired position. In one variation, such an instrument can be a revolution counter 160 for counting the number of revolutions by the motor mechanism 150 or a gear attached to the mechanical link 155.

In an example, the calibrated number of revolutions can be determined based on calibrations performed by an administrator or an engineer for each possible platform movement. For a VLSS having three vertical layers, for example, separate calibrations can be performed for moving the platform 120 between a top position to a middle position and for moving the platform 120 between the middle position to a bottom position. In addition, the calibrations can be periodically performed to compensate for changes in the components of the motor mechanism 150 and/or the mechanical link 155 over time. For instance, the mechanical link 155 can be a chain link that can stretch over time, which can affect the distance the platform 120 is moved given the same number of revolutions performed by the motor mechanism 150. Accordingly, by periodically performing calibrations, the performance of the VLSS 100 can be guaranteed. In some examples, the VLSS 100 can be configured to self-calibrate based on data transmitted from the accelerometer 135 via, for example, the wireless sensor link 140. To perform self-calibrations, the control system 145 can receive, from the accelerometer 135, indications of impact (e.g., impact 139) by the platform 120 as it moves into the desired position and compare this data with the revolution counter 160 configured to measure or estimate the number of revolutions by the motor mechanism 150 and/or a gear coupled to the mechanical link 155. If the mechanical link 155 has been stretched over time, the accelerometer 135 may indicate impact by the platform 120 as it moves into the desired position prior to the revolution counter 160 reaching the calibrated number of revolutions. In response, the control system 145 can self-calibrate by correspondingly adjusting (e.g., lowering) the calibrated number of revolutions for moving the platform 120 from the initial position to the desired position.

According to embodiments, the control system 145 can monitor data (e.g., pitch 136, roll 137, yaw 138, impact 139) transmitted by the accelerometer 135 to generate the safety signal 147 which can be received by the motor mechanism 150. The safety signal 147 can be a signal generated in response to a detected safety event. In certain implementations, the control signal 146 and safety signal 147 can be generated and treated by the control system 145 and the motor mechanism 150 as a single signal. A safety event can correspond to the platform 120 making unexpected impact with another object. The safety event can also correspond to the motor mechanism 150 or the mechanical link 155 experiencing issues or failing while the platform 120 is being move to the lowered position 123. For instance, one or more mechanical chain links constituting the mechanical link 155 can snap or break, or the motor mechanism 150 can jam. The safety event can further correspond to external events such as a seismic event (e.g., earthquake) or accident such as a vehicle, while being driven, crashing into the lift frame 115. In each of these cases, the accelerometer 135 can detect the effects on the platform 120 and, in response, the control system 145 can generate an appropriate safety signal 147.

As an example, the control system 145 can, in response to user input 111, generate the control signal 146 to cause the motor mechanism 150 to move the platform 120 from the raised position 122 to the lowered position 123. As the platform 120 begin to move, the accelerometer 135 can automatically begin transmitting data (e.g., pitch 136, roll 137, yaw 138, impact 139) over the wireless sensor link 140 to the control system 145. In one scenario, the platform 120 can impact an object prior to reaching the lowered position 123, thereby causing a safety event. In such a scenario, the control system 145 can determine the occurrence of a safety event by analyzing the data from the accelerometer 135 with reference to the revolution counter 160. For instance, data from the accelerometer 135 (e.g., impact 139) can indicate the impact with the object before the revolution counter 160 having reached the calibrated number of revolutions needed to bring the platform 120 from the raised position 122 to the lowered position 123. Based on this analysis, the control system 145 can determine that the data from the accelerometer 135 indicates an undesired and/or unexpected impact by the platform 120 (e.g., an impact other than the one experienced by the platform as it moves into position into the lowered position 123), and thus indicates a safety event.

In addition, the control system 145 can determine a safety event has occurred in response to the accelerometer 135 detecting that the platform 120 experiences a pitch rotation, roll rotation, or a yaw rotation. For instance, when the platform 120 impacts an object as it moves from its initial position to a desired position, the platform 120 can experience a rotation or tilt. The accelerometer 135 can detect such a rotation experienced by the platform 120 force and communicate to the control system such a detection via measurements such as the pitch 136, roll 137, or yaw 138. The control system 145 can, in response to receiving data from the accelerometer 135 that exceeds one or more thresholds, determine that a safety event has occurred and can generate a safety signal 147. For instance, in the example given, the platform 120 can impact as it moves down from the raised position 122 to the lowered position 123. As it makes impact, the platform 120 can experience a tilt to one side due to the impact with the object (e.g., because the object is located on one side of the platform 120). The accelerometer 135 can transmit data (e.g., pitch 136, roll 137, and/or yaw 138) that indicate the tilt of the platform 120 to the control system 145 via the wireless sensor link 140. In response to receiving from the accelerometer 135 that exceed predetermined thresholds (e.g., pitch 136 exceeding a pitch rotation threshold value, or roll 137 exceeding a roll rotation exceeding a roll rotation threshold value, and/or yaw 138 exceeding a yaw rotation threshold value), the control system 145 can determine that a safety event has occurred and generate an appropriate safety signal 147.

According to embodiments, the control system 145 can further determine the occurrence of a safety event based on data from the accelerometer 135 when the platform 120 is not moving from one position to another. For example, the mechanical link 155 can fail while the platform 120 is stationary or the VLSS 100 can experience a seismic event or an accident (e.g., the lift frame 115 can be hit by a vehicle etc.). In these instances, the accelerometer 135 can detect movement of the platform 120 caused by the safety event and transmit the data generated to the control system 145 via the wireless sensor link 130. The control system 145 can, in response, detect the occurrence of the safety event based on receiving the accelerometer data while the platform 120 is supposed to remain in place.

In various aspects, in addition to detecting the occurrence of a safety event, the control system 145 can further discern a type of safety event by analyzing the data from the accelerometer 135 and other sensors. For instance, the control system 145 can further determine that a detected safety event corresponds to a failure of the mechanical link 155. The control system 145 can also determine that another detected safety event corresponds to an impact against an external object while the platform 120 is being moved into a desired position. In addition, based on the data from the accelerometer 135 (e.g., pitch 136, roll 137, yaw 138), the control system 145 can determine which side of the platform impacted the external object while it is being moved into the desired position. At a high level, because the sensor readings corresponding to each of the types of safety events differ by nature, the control system 145 can determine which safety event type a detected safety event most likely is by analyzing the received sensor data, including data from the accelerometer 135. Thus, to determine safety event types, the control system 145 can maintain event profiles for a plurality of types of safety event types. An event profile can comprise simulated or accumulated sensor data that correspond to a particular type of safety event. For instance, impact with an external object on one side of the platform 120 as it is being moved into a position can have a different event profile compared to impact with an external object on another side of the platform 120. A failure of the mechanical link 155 can also have one or more safety event profiles. Separate safety event profiles can even be maintained for failures of different components of the mechanical link 155. For instance, the mechanical link 155 can comprise multiple chain links (e.g., one on each corner of the platform 120) and individual safety event profiles can be maintained for failure of each of the multiple chain links. The control system 145 can analyze the received data from the accelerometer 135 and other sensors and compare the received data against the event profiles to determine an event profile that best matches the received sensor data to determine a type of safety event that corresponds to the received sensor data. In addition to or as an alternative, a machine-learned model (e.g., tree-based model, an artificial neural network, etc.) can be utilized to determine a safety event type based on sensor data (e.g., data from the accelerometer 135). The machine-learned model can be trained over time via supervising input from an administrator or lift operator. The control system 145 can further utilize other information, such as the state of the platform 120 (e.g., whether the platform 120 was being moved from one position to another while the safety event was detected), to aid in determining a safety event type.

According to examples, the safety signal 147 generated by the control system 145 can cause the VLSS 100 to perform one or more operations to protect the vehicle(s) and components of the VLSS 100 affected by the detected safety event. For instance, if the detected safety event corresponds to the platform 120 impacting an external object as the platform 120 is being moved from its initial position to a desired position (e.g., while the motor mechanism 150 is operating in a normal mode of operation), the safety signal 147 can cause the motor mechanism 150 to stop moving the platform 120 in the direction of the desired position (e.g., to stop operating in the normal mode of operation). In addition, the safety signal 147 can cause the motor mechanism 150 to perform safety operations (e.g., enter a safety mode) including moving the platform 120 back to its initial position or to another position that is deemed safe by the control system 145 (e.g., a position between the initial position and the desired position). In other instances, such as when the detected safety event corresponds to a seismic event or to a failure of the mechanical link 155, the safety signal 147 can cause one or more safety latches to engage to improve the stability of the platform 120. In certain implementations, the safety signal 147 can be based on various sensor data such as data received from the accelerometer 135. For instance, if the data from the accelerometer 135 (e.g., pitch 136, roll 137, yaw 138) indicate that the platform 120 is experiencing a tilt in a particular direction due to the detected safety event, the control system 145 can generate the safety signal 147 to cause the motor mechanism 150 to counteract or offset the detected tilt caused by the safety event. In certain implementations, the safety signal 147 can be generated based on the type of safety event determined by the control system 145.

According to embodiments, the control system 145 can generate an alert message 148 for transmission over one or more networks 180 to an administrator system 195. The alert message 148 can be transmitted via a network interface 170 of the VLSS 100. In addition or as an alternative, the alert message 148 can be transmitted to a cloud or network service for managing the VLSS 100. The alert message 148 allows an administrator or operator overseeing the operations of the VLSS 100 to be notified of events that require their attention. For instance, the alert message 148 can be generated for transmission to the administrator system 195 in response to detecting a safety event. The alert message 148 can include detailed information regarding the detected safety event including, for example, time of the detected safety event, type of safety event detected, identification of the affected platform(s), identification of vehicles and/or users affected, and the like. In certain implementations, the VLSS 100 can be equipped with one or more cameras and the alert message 148 can include a video clip or a link to a video clip of the detected safety event.

Furthermore, the control system 145 can generate the alert message 148 regarding the maintenance and upkeep of the VLSS 100. For example, the revolution counter 160 can indicate a cumulative revolution exceeding a maintenance threshold, which may indicate a recommended or required service of the motor mechanism 150 and/or the mechanical link 155. In response, control system 145 can generate an alert message 148 for transmission to the administrator system 195 that indicates detailed information regarding the recommended or required service, including, for example, identification of the motor mechanism(s) 150 and/or mechanical link(s) 155 requiring service and type of service that is recommend or required. In this manner, the VLSS 100 can dynamically alert administrators or operators of the VLSS 100 when maintenance or service is required by individual components of the VLSS 100. Because frequency of desired maintenance and service can depend on the usage of the VLSS 100, it is particularly advantageous for the VLSS 100 to be able to dynamically alert the administrator or operator when maintenance or service is required for particular components of the VLSS 100.

Figure 2A:
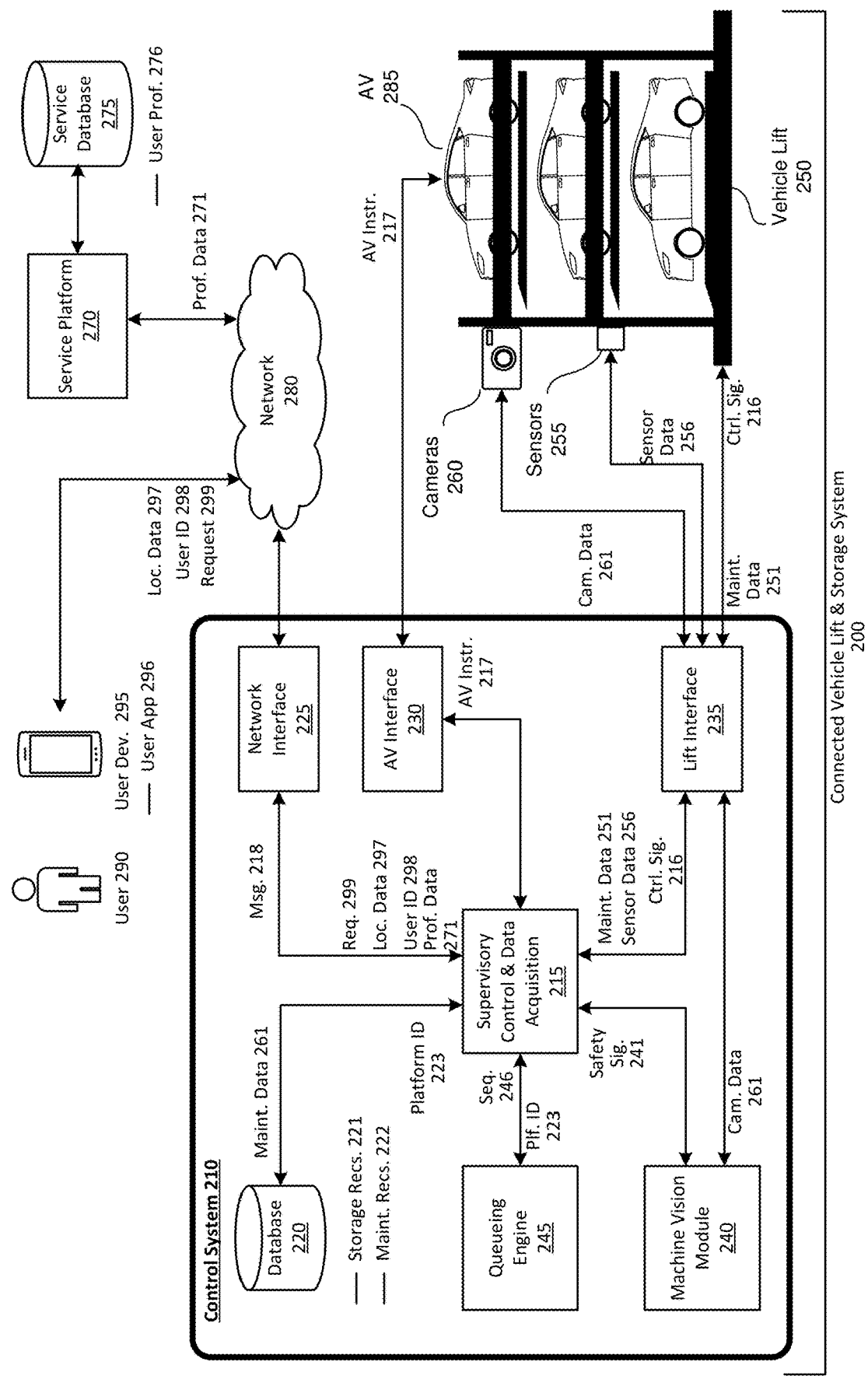
FIG. 2A is a block figure diagram illustrating an example connected VLSS, in accordance with examples described herein.

FIG. 2A is a block figure diagram illustrating an example connected vehicle lift and storage system, in accordance with examples described herein. The connected VLSS 200 comprises a control system 210 and a vehicle lift 250. The connected VLSS 200 can further include components illustrated and described with respect to FIG. 1 including, for example, one or more motor platforms, mechanisms, mechanical links, etc.

According to embodiments, the vehicle lift 250 can store a plurality of vehicles and can comprise a plurality of platforms (not illustrated in FIG. 2) that can be moved between a plurality of positions. The vehicle lift 250 can have multiple levels and the platforms can be moved vertically between them. In certain examples, the platforms can also be moved horizontally between a plurality of horizontal positions. The vehicle lift 250 can be configured in accordance with a plurality of possible configurations. For instance, the vehicle lift 250 can be a simple vehicle lift in which the platforms of the vehicle lift can be moved only vertically. The vehicle lift 250 can also be of a Puzzle VLSS configuration in which the platforms can be moved vertically and horizontally. In addition, the vehicle lift 250 can be of a Tower VLSS configuration. In each possible configuration, vehicles can enter and exit the vehicle lift 250 via one or more vehicular access positions. A platform can be moved into a vehicular access position to enable a vehicle to enter the vehicle lift 250 and onto the platform. Subsequently, the platform can be moved to another position within the vehicle lift 250 to store the vehicle. When the vehicle is to be retrieved, the platform can be moved back to the vehicular access position (or to another vehicular access position) so that the vehicle can be driven off the platform by the user. The platforms can be moved by motor mechanisms and mechanical links similar to those described with respect to FIG. 1 (e.g., motor mechanism 150 and mechanical link 155).

According to embodiments, the control system 210 can control various aspects of the operations of the vehicle lift 250. For instance, the control system 210 can receive and process user requests 299 to store and retrieve their vehicles on the vehicle lift 250. In doing so, the control system 210 can perform various functions such as one or more of: communicating with user devices 295 operated by users 290 to receive user requests 299, verifying the users 290, communicating with a service platform 270 to retrieve additional information regarding the users 290, determining an optimal sequence for moving the plurality of platforms for a given set of user requests, and/or controlling the movement of the platforms on the vehicle lift 250 in accordance with the determined sequence. In certain implementations, the connected VLSS 200 may include a plurality of vehicle of various configurations all of which can be controlled by the control system 210.

In the examples described herein, the control system 210 can include a network interface 225 for communicating with user devices 295 operated by users 290 over one or more networks 280. The user devices 295 can execute dedicated user application 296. The dedicated user application 296 can enable a user 290 to submit a request 299 to store or retrieve his or her vehicle on the vehicle lift 250. The user device 295 can transmit, via the user application 296, location data 297 and user ID 298 to the control system 210 as part of the request 299 to retrieve or store the user's vehicle. The location data 297 can be generated by a location-aware resource of the user device 295 (e.g., GPS, GLONASS, Galileo, or BeiDou receiver) and can indicate a current location of the user 290. The user ID 298 can be a unique identification number or token for the user 290 across the cloud or network service managed by the service platform 270.

In certain implementations, the control system 210 can also communicate with a service platform 270 via the network interface 225 and the one or more networks 280. The service platform 270 can run a cloud or network service for operating and managing a plurality of VLSS's such as the connected VLSS 200. For instance, the cloud or network service can enable a uniform and consistent user access and experience across the plurality of VLSS's managed by the cloud or network service. In doing so, the service platform 270 can maintain a corresponding user profile for each of a plurality of users 290. The service platform 270 can also process financial transactions and handle parking reservations associated with the users' use of the VLSS's.

According to embodiments, the control system 210 can include supervisory control and data acquisition (SCDA) 215. The SCDA 215 can act as a central hub or processor of the control system 210 to receive and process requests and other information. Among other functions, the SCDA 215 can generate a control signal 216 to control the movement of the platforms of the vehicle lift 250. As part of this function, the SCDA 215 can also receive sensor data 256 from sensors 255 of the vehicle lift 250. Such sensors can include accelerometers attached to platforms of the vehicle lift 250 as well as other sensors. For instance, the control signal 216 can be generated by the SCDA 215 based on the sensor data 256. In other respects, the SCDA 215 can receive user requests to store or retrieve vehicles via the network interface 225 and process such requests.

To retrieve his or vehicle, the user 290 can transmit a request 299 for vehicle retrieval operations. The request 299 can include the user's location data 297 and a user ID 298 of the user 290. The user 290 can interact with the user application 296 to transmit the request 299 requesting vehicle retrieval operations. In some implementations, the user device 295 can be configured to automatically transmit the request 299 requesting vehicle retrieval operations. For instance, the user device 295 can be configured to automatically transmit the request 299 based on the user device 295 being located within a certain distance of the connected VLSS 200 (e.g., based on the location data 297) or based on the user device 295 being within communication range of the connected VLSS 200 (e.g., within Bluetooth or Wi-Fi range, etc.). For example, the request 299 can be automatically transmitted once the user device 295 is connected to a particular Wi-Fi network or establishes Bluetooth connection with the connected VLSS 200.

In response to receiving a user request 299 to retrieve the user's vehicle, the control system 210 can identify, based on the user ID 298, a platform on which the user's vehicle is stored from the plurality of platforms of the connected VLSS 200. For instance, the control system 210 can include a database 220 that maintains storage records 221 that associate users and their vehicles with the platforms the vehicles are stored on. Thus, by querying the database 220 (e.g., using the user ID 298), the SCDA 215 can receive a platform ID 223 that identifies the platform on which the user's vehicle is stored. In some instances, the user 290 may have two or more vehicles stored on the storage lift 250. In such situations, the request 299 can further specify a vehicle ID and the SCDA 215 can further query the database 220 using the specified vehicle ID to identify the platform to be moved to a vehicular access position.

According to embodiments, the control system 210 can include a queueing engine 245 for determining and updating a sequence for moving the platforms to fulfill user requests to store and retrieve vehicles. The sequence can identify the order and positions in which platforms are moved to fulfill pending user requests. In one aspect, the control system 210 and the queueing engine 245 can determine and/or update the sequence based on the existing or current positions of the platforms within the vehicle lift 250. For instance, a sequence determined in response to a vehicle retrieval request from user 290 for his or her vehicle can depend on where that vehicle is stored within the vehicle lift 250. The database 220 can store this information as part of the storage records 221. In addition, the sequence can be determined and/or updated based on information that can indicate when user will be ready to retrieve his or vehicle, including as a requested time indicated in the retrieval request, user location, user profile information, and the like. In some instances, no other user requests are pending and the queueing engine 245 simply determines the optimal sequence of platform movements to move the identified platform storing the user's vehicle to a vehicular access position. The queueing engine 245 can optimize the sequence based on fewest number of platform movements, quickest estimated time to retrieve the vehicle, minimize wait times for the user submitting requests, etc.

An example sequence can be described with respect to FIGS. 2B to 2D. FIGS. 2B to 2E illustrate front views of an exemplary vehicle lift 250 being configured in accordance with a 3×2 Puzzle VLSS Configuration having five platforms (Platforms 1-5) for storing vehicles. The five platforms can be moved into six possible positions within the vehicle lift 250: Positions A-F. Of the six possible positions, three (Positions B, D, and F) are vehicular access positions because they are on the same level as the ground. FIG. 2B illustrates a view of the exemplary vehicle lift 250 prior to receiving a user request to retrieve vehicles. In FIG. 2B, three vehicles are stored on the vehicle lift 250: Vehicle 1 on Platform 1, Vehicle 2 on Platform 3, and Vehicle 3 on Platform 4. In response to receiving a request 299 from a user device 295 for retrieval of the vehicle of user 290, the control system 210 can first determine, based on the user ID 298, that the vehicle of the user 290 (Vehicle 1) is stored on Platform 1. Subsequently, the control system 210 and/or the queueing engine 245 can determine that, to retrieve Vehicle 1 (e.g., move Platform 1 to a vehicular access position), the optimal sequence is: (1) move Platform 4 to Position F, (2) move Platform 2 to Position D, and (3) move Platform 1 to Position B. FIG. 2C illustrates the positioning of the platforms within the vehicle lift 250 after the determined sequence of platform moves to retrieve the user 290's vehicle (Vehicle 1) has been completed. As can be seen, Vehicle 1 is now in a vehicular access position (Position B), thus allowing the user 290 to retrieve Vehicle 1 from the vehicle lift 250. The optimal sequence can be so determined because the sequence involves the least number of platform moves and is also estimated to be the fastest.

In some instances, one or more other requests to retrieve or store vehicles may be pending while the control system 210 receives user request 299. Or the request 299 can be received at substantially the same time as another request from another user. In such instances, the control system 210 and the queueing engine 245 can perform multi-variate optimizations to determine an optimal sequence for the multiple users who are requesting vehicle storage or retrieval operations. The sequence can be determined and/or updated to minimize the cumulative wait time of each of the users who have submitted requests. In one aspect, the sequence can be determined based on respective locations of the requesting users. For instance, a user's vehicle retrieval request can be de-prioritized (e.g., placed in the back of the sequence) based on the user's data indicating that the user is located far away from the vehicle lift 250 (or the connected VLSS 200). In addition or as an alternative, the control system 210 and/or queueing engine 245 can estimate a time of arrival at the vehicle lift 250 for each of the users who submitted a vehicle retrieval request based on the users' respective location data. The queueing engine 245 can then determine a sequence or update an existing sequence based on the estimated times of arrival of the users. In addition, the sequence can be determined based on comparing the location data and/or ETA of two or more users.

In the above described example, a second request for vehicle retrieval from a second user can be received while the vehicle lift 250 is performing the operations to move Vehicle 1 to Position B. In response to the second request, the control system 210 can determine that the second user's vehicle (Vehicle 2) is stored on Platform 3. Thus, to fulfill both the first request (retrieval of Vehicle 1) and the second request (retrieval of Vehicle 2), both Platforms 1 and 3 need to be moved to one or more vehicular access positions. The control system 210 can compare the location data of the first user (user 290) and the second user to determine that the first user is much closer to the vehicle lift 250 and thus likely to be ready to retrieve Vehicle 1 much earlier than the second user is able to retrieve Vehicle 2. In response to such a determination, the queueing engine 245 can determine to update the sequence such that Platform 1 is moved to Position B for the first user to retrieve Vehicle 1 (as illustrated in FIG. 2C) and after Vehicle 1 is retrieved, Platform 3 is moved to Position D to allow Vehicle 2 to be retrieved by the second user. Accordingly, the sequence is updated to be: (1) move Platform 4 to Position F, (2) move Platform 2 to Position D, (3) move Platform 1 to Position B (and wait for Vehicle 1 to move off Platform 1), (4) move Platform 1 back to Position A, (5) move Platform 2 to Position B, and (6) move Platform 3 to Position D. FIG. 2D illustrates the positioning of the platforms within the vehicle lift 250 after this updated sequence of platform moves has been completed. Given the information that the first user is much closer to the vehicle lift 250 than the second user, this determined sequence can minimize the wait times for both users.

On the other hand, the control system 210 determine, based on the respective location data of the first and second users, that the second user is likely to arrive at the vehicle lift 250 at approximately the same time. In such a scenario, it may be undesirable to force the second user to wait for the first user to retrieve Vehicle 1 before Vehicle 2 is ready for retrieval (as illustrated in FIGS. 2C and 2D). Thus, based on this determination, the queueing engine 245 can determine to update the sequence to move both Vehicle 1 and Vehicle 2 to vehicular access positions before allowing either of the users to retrieve their vehicles. For instance, the queueing engine 245 can update the sequence to be: (1) move Platform 4 to Position F, (2) move Platform 2 to Position D, (3) move Platform 1 to Position B, (4) move Platform 3 to Position A, (5) move Platform 2 to Position C, (6) move Platform 1 to Position D, and (7) move Platform 3 to Position B. FIG. 2E illustrates the positioning of the platforms within the vehicle lift 250 after this updated sequence of platform moves has been completed. Compared with the sequence discussed above with respect to FIG. 2D, the first user may have to wait an additional amount of time before she or he can retrieve Vehicle 1 and there are seven required platform moves compared with six. However, the cumulative wait time of both the first user and the second user is optimized because the second user does not have to wait for the first user to retrieve Vehicle 1 before Vehicle 2 can be moved into place for retrieval. Thus, in the given circumstances (e.g., the first user and the second user estimated to arrive at the vehicle lift 250 at approximately the same time), this updated sequence can be more optimal.

Referring back to FIG. 2A, in certain implementations, the control system 210 and queueing engine 245 can determine and/or update the sequence based on profile data 271 received from the service platform 270. The profile data 271 can be data retrieved from a corresponding user profile 276 maintained for the requesting user 290. For instance, the profile data 271 can indicate a preference for the user 290 to retrieve his or her vehicle at a preferred vehicular access position (e.g., a preferred entry/exit in a Tower Configuration VLSS). Based on this information, the control system 210 and queueing engine 245 can determine the sequence such that the vehicle of user 290 is moved to the preferred vehicular access position in response to a vehicle retrieval request from the user 290. The profile data 271 can further indicate parameters gathered from past usage of VLSS's managed by the service platform 270 by the user 290. As an example, the profile data 271 can indicate that the user 290 typically arrives earlier than requested vehicle retrieval times indicated in the user's requests. Based on this information and in response to a request 299 from the user 290, the control system 210 and queueing engine 245 can update the sequence such that the vehicle of the user 290 can be ready for retrieval before a requested time indicated in the user's request 299.

It is contemplated that the control system 210 and queueing engine 245 can determine sequences of platform movements for other configurations of the vehicle lift 250 or connected VLSS 200. For example, the control system 210 and queueing engine 245 can determine sequences for other types of Puzzle Configurations, such as a 4×3 Puzzle Configuration or a 6×4 Puzzle Configuration. Similarly, the control system 210 and queueing engine 245 can determine sequences for a Tower Configuration VLSS. As described with respect to FIGS. 2B to 2E, these sequences can be determined and updated in response to user requests and based, at least in part, on one or more of: the current positions of the platforms within the vehicle lift 250, location data of each of the users submitting vehicle retrieval requests, ETA to the vehicle lift 250 of each of the users submitting vehicle retrieval requests, user profile information, and the like. In addition, for certain configurations like the Tower Configuration, there can be multiple sequences determined for the vehicle lift 250. For instance, a Tower Configuration can have two or more vehicular access positions and the platforms may be moved independently between to and from these vehicular access positions. In such instances, the control system 210 and the queueing engine 245 may manage two or more independent sequences for moving the platforms to and from these vehicular access positions to complete vehicle retrieval and storage requests from users.

In addition, the control system 210 and queueing engine 245 can determine to move the platforms of vehicle lift 250 based on scheduled user requests or in anticipation of user requests. For instance, the control system 210 can receive a request 299 indicating a request to retrieve the vehicle of the user 290 in two hours. In response, the control system 210 and queueing engine 245 can optimize the sequence such that during downtimes in the following two hours (e.g., during times when there would otherwise be no platform movements), the platform storing the vehicle of user 290 can be moved towards or closer to a vehicular access position such that the vehicle can be quickly retrieved for the user 290 in two hours' time. As another example, the control system 210 and queueing engine 245 can anticipate a future user request based, for example, on profile data 271 indicating that the user 290 typically retrieves her or his vehicle at 5 P.M. on weekdays. In response, the control system 210 and queueing engine 245 can determine to move the platform storing the vehicle of user 290 towards or closer to a vehicular access position at 4:30 P.M. such that the vehicle can be easily retrieved for the user 290 at 5:00 P.M., when the user 290 typically retrieves the vehicle.

Furthermore, the control system 210 and the queueing engine 245 can determine and/or update the sequence in response to receiving the request 299 from the user 290 requesting for vehicle storage operations. Vehicle storage requests can be treated similarly to vehicle retrieval requests in that an existing sequence of platform movements can be updated to accommodate for a received vehicle storage request. In response to a request 299 to store a vehicle, the queueing engine 245 can determine a position within the vehicle lift 250 to store the vehicle and based on that optimal position, determine a sequence of platform movements (or update an existing sequence) such that the platform storing the vehicle of the user 290 is moved into the determined position. According to one aspect, in response to a vehicle storage request, the control system 210 and the queueing engine 245 can determine the optimal position for the vehicle of the user 290 based on profile data 271. The profile data 271 may indicate a preferred position within the vehicle lift 250 to store the user's vehicle. In addition, the profile data 271 can include usage history information. As an example, the profile data 271 can indicate that the user typically stores his or her vehicle from 8 A.M. to 5 P.M. on weekdays (e.g., parking at the user's workplace). In response, the control system 210 and queueing engine 245 can determine an optimal position to store the user's vehicle given this information. For instance, given that the user 290 typically stores his or her vehicle typically during business hours, the queueing engine 245 can determine to move the platform storing the user's vehicle to a position farther away from the vehicular access positions since the vehicle does not need to be accessed for many hours. In another respect, the request 299 for vehicle storage operations can further indicate an expected time of vehicle retrieval, which can be used to determine the position to which the platform storing the user's vehicle will be moved. As an example, the user 290 can indicate in the request 299 for vehicle storage operations that she or he will retrieve the vehicle within an hour of storing it (e.g., a short trip to the stores). In response, the control system 210 and the queueing engine 245 can determine to move the platform storing the vehicle of the user 290 to a position close to a vehicular access position because the vehicle is expected to be retrieved soon. Such optimizations performed by the control system 210 and the queueing engine 245 in storing vehicles can reduce platform movements and wait times for users of the vehicle lift 250.

In addition, the control system 210 and the queueing engine 245 can determine the sequence of platform movements in response to a request 299 (e.g., for retrieval or for storage) based, at least in part, on maintenance records 222 maintained in the database 220. For example, the maintenance records 222 can indicate malfunctions with moving platforms into a particular position within the vehicle lift 250. The control system 210 may have detected such malfunctions during previous operations of the vehicle lift 250 or an administrator may have entered the information regarding the malfunction into the database 220. Based on this maintenance information, in response a request 299, the control system 210 and the queueing engine 245 can determine a sequence that does not involve moving any platforms in into the particular position experiencing malfunctions. As another example, a given platform may have issues preventing vehicles from safely getting on and/or off the platform. Based on this maintenance information, the control system 210 and the queueing engine 245 can operate in response to a request 299 for vehicle storage operations such that the problematic platform is not identified for vehicle storage. In addition, the control system 210 can transmit information regarding detected or identified malfunctions or problems to the service platform 270 to enable the service platform 270 to maintain up-to-date availability information in view of the malfunctions or problems. Among other benefits, this allows the connected VLSS 200 to continue operating even when mechanical or other problems are detected or identified.

According to one implementation, some of the platforms of the vehicle lift 250 can include specialized equipment such as electric vehicle charging ports. Thus, the SCDA 215 and the queueing engine 245 can determine, in response to a request 299 to store a vehicle, to move one of the platforms that include the specialize equipment to a vehicular access position such that the requesting user may access the specialized equipment. For instance, the request 299 or the profile data 271 of the user may indicate that the vehicle being stored by the user 290 is an electric vehicle. In response to such a request 299, the SCDA 215 and the queueing engine 245 can identify an available platform that includes compatible electric vehicle supply equipment (EVSE) for charging the user's vehicle. The SCDA 215 and the queueing engine 245 can cause the identified platform to be moved to a vehicular access position such that the user's vehicle can be stored on the identified platform. In this manner, the EVSE of the identified platform can be used to charge the on-board batteries of the user's electric vehicle while the vehicle is being stored in the vehicle lift 250.

According to embodiments, the SCDA 215 can further generate a message 218 to be transmitted to the user device 295 via the network interface 225 and the one or more networks 280. The message 218 can be transmitted after a requested vehicle storage operation has been completed. The message can inform the user 290 that the user's vehicle has been stored. In response, the user application 296 can prompt a user input of a time to retrieve the vehicle such that a vehicle storage request can be scheduled. In addition, the message 218 can be transmitted in response to a vehicle retrieval request. In this instance, the message 218 can inform the user 290 of an estimated time the vehicle will be ready for retrieval. In certain examples, the message 218 can further inform the user 290 of the vehicular access position the vehicle will be placed after the retrieval operation is complete. For instance, for a Tower Configuration VLSS having a plurality of vehicular access positions located at different access points of a building structure, the message 218 can inform the user at which access point to pick up her or his vehicle.

In certain implementations, the control system can include an AV interface 230 for interfacing with autonomous vehicles (AVs). The SCDA 215 can generate AV instructions 217 for transmission to an AV 285. The AV instructions 217 can be transmitted via the one or more networks 280 or can be transmitted via a local network (e.g., Wi-Fi or Bluetooth) or a dedicated wireless communication channel. The AV instructions 217 can cause the AV 285 to enter and exit the vehicle lift 250 (e.g., pull into or pull out of a vehicular access position). Thus, as part of the vehicle storage and/or retrieval operations, the control system 210 can direct the AV 285 to autonomously drive itself onto or off the vehicle lift 250.

In various aspects, the vehicle lift 250 can include one or more cameras 260 which can transmit camera data 261 to the control system 210 via the lift interface 235. The camera data 261 can be routed to a machine vision module 240 which can perform image analysis on the received camera data 261. The image analysis performed by the machine vision module 240 can be used to determine whether a vehicle is free of occupants (e.g., one or more persons or pets) prior to moving the vehicle to a storage position within the vehicle lift 250. For instance, the one or more cameras 260 can be positioned to capture images or videos through the windshield of the vehicle to allow the machine vision module 240 to determine if any occupants remain in the vehicle. The machine vision module 240 can further determine if any persons or objects are on the platform. In response to determining that at least one occupant remains in the vehicle or if a person or an object is placed on the platform, the machine vision module 240 can generate a safety signal 241 to the SCDA 215 to enable the SCDA 215 to stop the vehicle lift 250 from moving the platform (e.g., via the control signal 216). In certain implementations, the machine vision module 240 can also be configured to perform facial recognition to determine the identity of the user 290. In this manner, the user 290 can store and/or retrieve her or his vehicle by simply walking up to the vehicle lift 250. In doing so, the machine vision module 240 can identify the user and automatically process an appropriate request (e.g., store or retrieve) for the user based on the user's identity.

Figure 3:
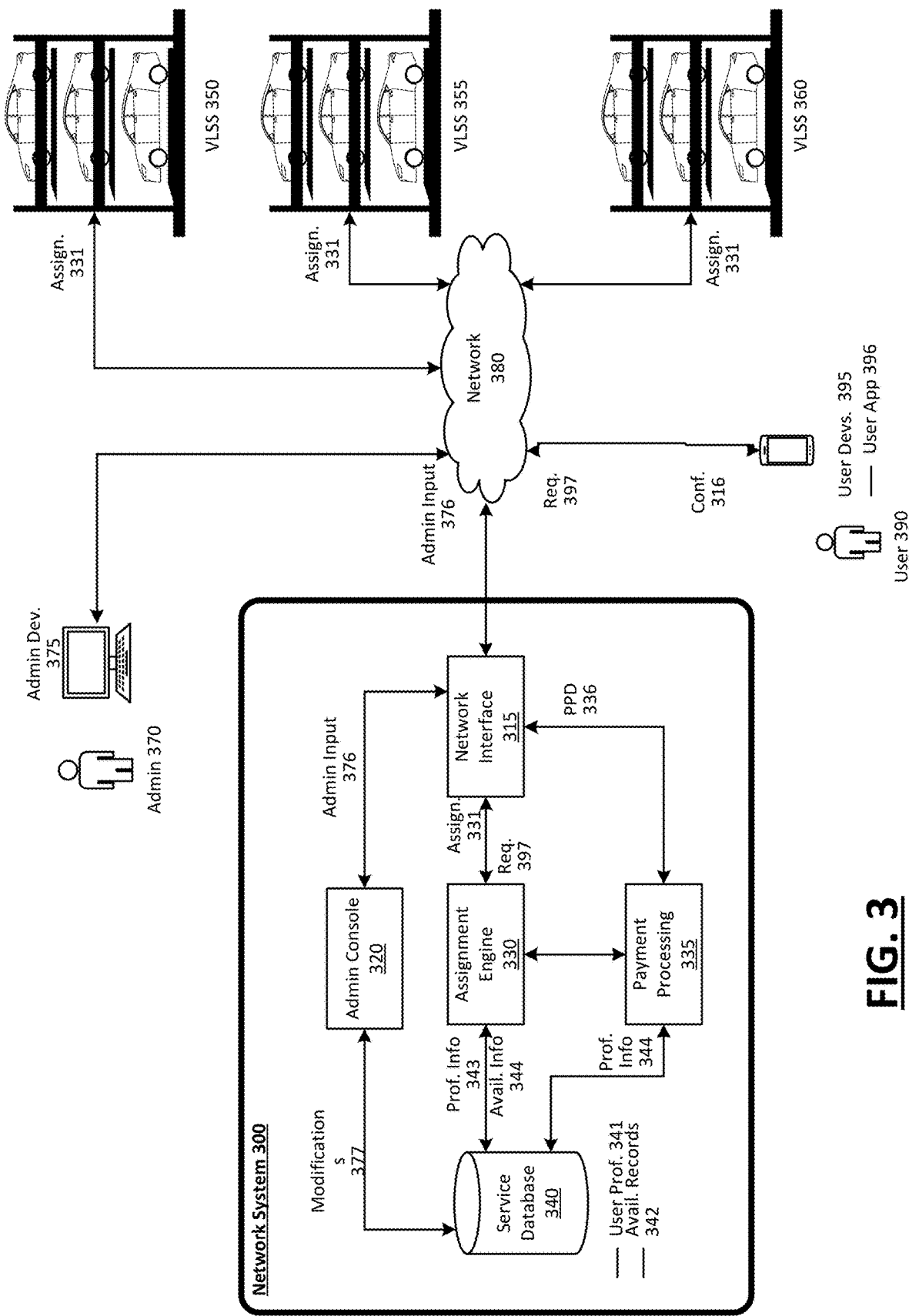
FIG. 3 is a block figure diagram illustrating a network system implementing a cloud or network service for managing a plurality vehicle lift and storage systems, in accordance with examples described herein.

FIG. 3 is a block figure diagram illustrating a network system 300 implementing a cloud or network service for managing a plurality of VLSS's 350, 355, and 360, in accordance with examples described herein. In the below discussion of FIG. 3, reference may be made to features and examples shown and described with respect to FIGS. 1 and 2A. For instance, network system 300 can be an embodiment of the service platform 270 shown and described with respect to FIG. 2A. In addition, the VLSS 350, 355, and 360 can be embodiments of the VLSS 200 shown and described with respect to FIG. 2A.

Referring to FIG. 3, the network system 300 can communicate with the plurality of VLSS's 350, 355, and 360 via a network interface 315 over one or more networks 380 in order to manage the plurality of VLSS's 350, 355, and 360. In one respect, the network system 300 can manage parking assignments across the plurality of VLSS's 350, 355, and 360. For instance, the network system 300 can determine, in response to a particular user's request for vehicle storage operations, in which of the plurality of VLSS's 350, 355, and 360 the user's vehicle is to be stored. In doing so, the network system 300 can maintain dynamically-updated availability information for each of the plurality of VLSS's 350, 355, and 360.

According to embodiments, the network system 300 can also communicate with a user device 395 that executes a user application 396 to receive a request 397. The request 397 can correspond to a request for vehicle storage operations from a user 390 or to a request for vehicle retrieval operations. The request 397 can include location data generated by one or more geo-aware resource of the user device 395. The request 397 can further include identification information (e.g., a unique username or user identification code) of the user 390. In certain implementations, the request 397 for vehicle storage operations can also indicate an requested duration of the time the user expects to store his or her vehicle.

In response to receiving a request 397 requesting vehicle storage operations, an assignment engine 330 of the network system 300 can determine a dynamic parking assignment 331. The dynamic parking assignment 331 can indicate at which of the plurality of VLSS's 350, 355, and 360 the user's vehicle is to be stored. In certain implementations, the dynamic parking assignment 331 can further indicate a position or section within a particular VLSS the user's vehicle is to be stored. The dynamic parking assignment 331 can be determined based on the availability information maintained by the network system 300 in a service database 340 (e.g., availability records 342). The dynamic parking assignment 331 can also be determined based on the user's location data transmitted as part of the request 397. For instance, the assignment engine 330 can determine the dynamic parking assignment 331 such that the identified VLSS is the closest one to the user 390 that has availability for the requested duration of time. After the dynamic parking assignment 316 has been determined, it can be transmitted to the relevant VLSS. In addition, the network interface 315 can generate and transmit, to the user device 395, a confirmation message 316. The confirmation message 316 can indicate the location of the assigned VLSS for the user 390's request 397. The confirmation message 316 can further include an indication of the estimated cost to the user 390 for parking the vehicle for the requested duration of time at the assigned VLSS.

From the user 390's point of view, the request 397 for vehicle storage operations can be performed automatically by the user device 395. For instance, the user 390 can, via the user application 396 or via a third-party mapping application, indicate a destination location such as a point of interest (e.g., a restaurant or a shop). In response, the user device 395 can be configured to automatically transmit the request 397 for vehicle storage operations. The request 397 can indicate the destination location or the point of interest as the location associated with the request 397. The request 397 can also be transmitted ahead of the user 390 arriving at the destination location and can indicate an estimated time of arrival at the destination location. Thus, the user device 395 can be configured to seamlessly and automatically request a parking assignment on behalf of the user 390 as the user 390 travels to the destination location. The network system 300 can then determine a dynamic parking assignment 331 for the user 390 and transmit the relevant information (e.g., location of the assigned VLSS) via the confirmation message 316. In response to receiving the confirmation message 316, the user application 396 and/or the third-party mapping software can be automatically updated to guide (e.g., via turn-by-turn navigation guidance) the user 390 to the location of the assigned VLSS.

In certain implementations, the availability records 342 maintained by the network system in service database 340 can include information regarding reserved parking assignments. For instance, a certain user may be permanently assigned to park his or her vehicle(s) at a particular one of the plurality of VLSS's managed by the network system 300. The particular VLSS may be a VLSS located at or near the certain user's place of residence or work. The reserved parking assignments can be associated with time periods in which parking for the certain user's vehicle(s) is guaranteed at the particular VLSS (e.g., 8 A.M. to 6 P.M. on weekdays). Outside of the indicated time periods, the assignment engine 330 can assign a space that is otherwise reserved for the certain user to other users requesting vehicle storage operations. Thus, the determination of a dynamic parking assignment 331 can be based on reserved parking assignments indicated in the availability records 342. In this manner, the network system 300 can dynamically manage the inventory of available parking spaces in the plurality of VLSS's 350, 355, and 360 to best suit the demand conditions.

According to embodiments, the service database 340 can also store user profiles 341. Each user of the cloud service managed by the network system 300 can have a corresponding user profile 341. A user profile 341 can include information such as name, address, contact information, method of payment, usage history information, and any permanent parking reservations. In various aspects, the dynamic parking assignment 331 can be determined based on profile data 343 retrieved from the user 390's user profile 341. For instance, the profile data 343 can indicate that the user has a reserved position at one of the VLSS's managed by the network system 300.

In various aspects, the network system 300 can include an admin console 320 for receiving administrator input 376 from an administrator device 375 operated by an administrator 370 of the network system 300. The administrator 370 can oversee various aspects of the cloud or network service run by the network system 300 for managing the plurality of VLSS's. For example, the administrator input 376 can modify user profiles 341 and assign reserved parking assignments at the VLSS's to specific users. The modifications 377 made by the administrator 370 can be saved to the service database 340. In addition, the network system 300 can include payment processing 335 for processing payments on behalf of users. The payment processing 335 can retrieve payment processing information 344 from the service database 340 (e.g., using billing information in the user profiles 341). The payment processing 335 can generate payment processing data 336 for transmission to one or more financial institutions. In certain implementations, the platforms of the VLSS's 350, 355, or 360 can include electric vehicle supply equipment (EVSE) for charging electric vehicles. For a user 390 charging his or her electrical vehicle at a VLSS managed by the network system 300, the network system 300 can maintain a record of amounts of electricity (e.g., in terms of kilowatt hours) consumed by user 390's vehicle. Thus, the payment processing 335 can also process a payment for the user 390's consumption of electricity in charging his or her electric vehicle at the VLSS.

Methodologies

Figure 4:
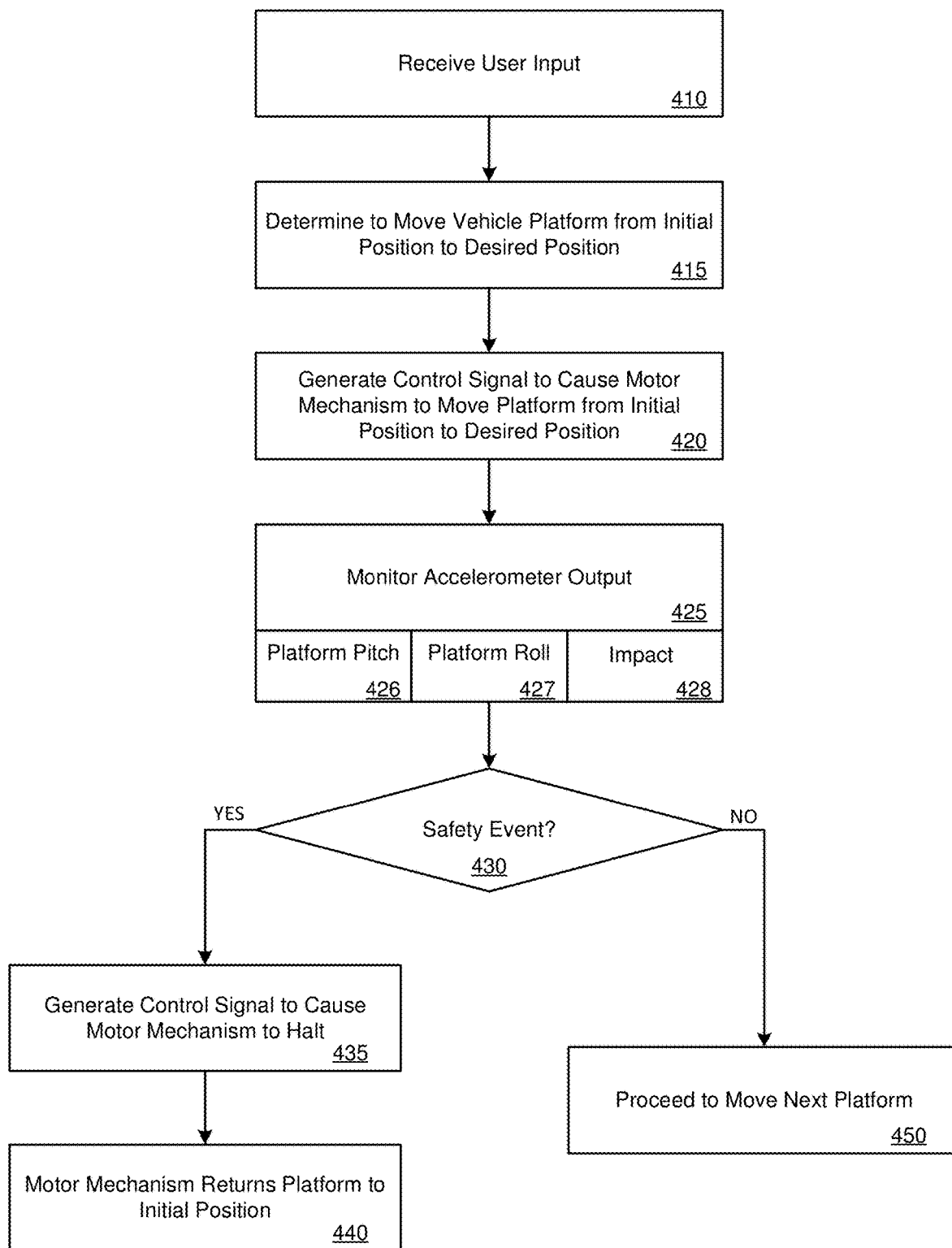
FIG. 4 is a flow chart describing an example method of operating an example vehicle lift and storage system, as shown and described herein.

FIG. 4 is a flow chart describing an example method of operating an example VLSS, as shown and described herein. In the below discussion of FIG. 4, reference may be made to features and examples shown and described with respect to 1. For instance, the exemplary method illustrated in FIG. 4 and described below can be performed by the VLSS 100 of FIG. 1.

Referring to FIG. 4, the VLSS 100 can receive user input (410). The input can be received via a user terminal of the VLSS 100 or can be received via a mobile computing device operated by the user. The user input can specify a request for a vehicle storage operation or a vehicle retrieval operation. In response to the user input, the VLSS 100 can determine to move a given platform of the VLSS 100 from its initial position to a desired position (415). This determination can be based on a sequence of platform moves determined by the VLSS 100 in response to the received user input. A plurality of platforms can be moved to various positions such that the user's request can be fulfilled. An exemplary sequence for platform moves in response to a user request are shown and described with respected to FIGS. 2B to 2E. As part of the sequence of platform moves determined by the VLSS 100 in response to the user request, the given platform can be determined to be moved from its initial position to the desired position. In other words, the given platform can be moved to the desired position as part of the determined sequence of platform moves to fulfill the user's request.

According to embodiments, the control system 145 of the VLSS 100 can generate control signal 146 to cause the motor mechanism 150 to move the given platform from its initial position to the desired position (420). The control system 145 can then begin monitoring the output of the accelerometer 135 attached to the given platform (425). The control system 145 can monitor for a pitch rotation of the platform (426), a roll rotation of the platform (427), and an impact experienced by the platform as it moves from its initial position to its desired position (428). The output of the accelerometer 135 can also be monitored for a yaw rotation of the platform.

The control system 145 can determine, based on the accelerometer output, whether a safety event has occurred (430). A safety event can be determined to have occurred if the pitch rotation of the platform exceeds a pitch threshold, if the roll rotation of the platform exceeds a roll rotation, or if the yaw rotation of the platform exceeds a yaw threshold. In addition, a safety event can be determined to have occurred if an impact is detected by the accelerometer prior to the platform having reached the desired position.

If safety event has been detected, the control system 145 can generate a control signal to cause the motor mechanism to halt operating in its normal mode of operation in moving the given platform to the desired position (435). In addition or as an alternative, the control system 145 can generate a safety signal to the motor mechanism 150 to cause the motor mechanism 150 to cease operating in its normal mode of operation in moving the platform to the desired position.

In certain implementations, the control system 145 can characterize the detected safety event or determine an event type for the detected safety event based on the data from the accelerometer 135. Based on the characterization of the safety event or the determined event type, the control system 145 can cause the motor mechanism to perform a variety of safety functions to alleviate or resolve the safety event. For instance, if the detected safety event is determined to correspond to the given platform impacting an external object (e.g., an open car door) while being moved from its initial position to the desired position, the control system 145 can cause the motor mechanism to operate in a safety mode to bring the given platform back to its initial position (440).

If no safety event is detected and the given platform has been moved into the desired position, the VLSS 100 can proceed to moving the next platform specified in the sequence of platform moves to fulfill the user request (450).

Figure 5:
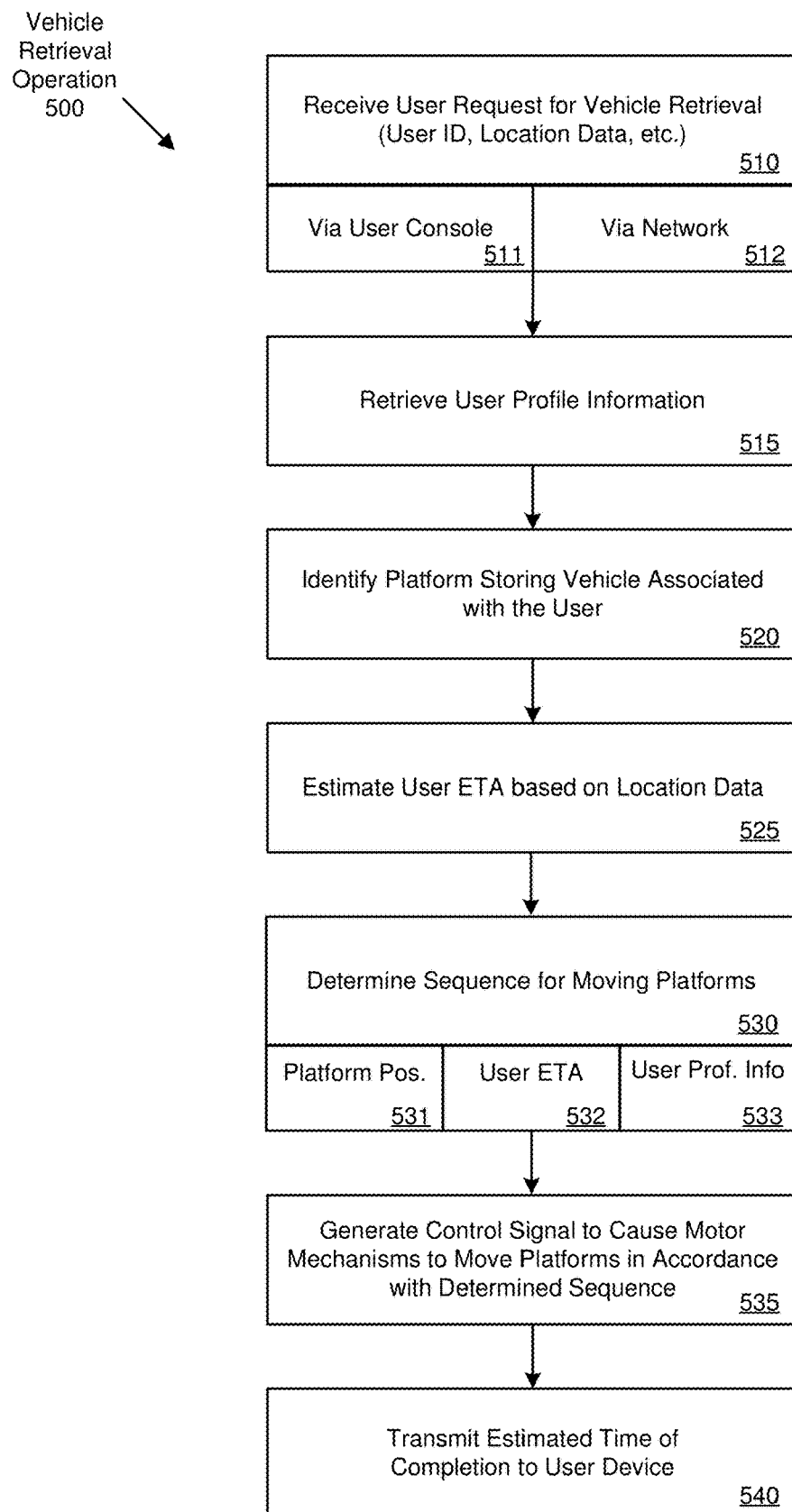
FIG. 5 is a flow chart illustrating an example method of performing a vehicle retrieval operation, as shown and described herein.

FIG. 5 is a flow chart illustrating an example method of performing a vehicle retrieval operation, as shown and described herein. In the below discussion of FIG. 5, reference may be made to features and examples shown and described with respect to FIGS. 2A to 2E. For instance, the example method of performing vehicle retrieval operation 500 can be performed by the connected VLSS 200 of FIG. 2A.

Referring to FIG. 5, the connected VLSS 200 can receive a user request for vehicle retrieval (510). The user request can include identification information of the user and the user's location data. The user request for vehicle retrieval can be received from a user console located at or near the connected VLSS 200 (511). The user request for vehicle retrieval can also be received via one or more networks from a computing device operated by the user (512).

In response to the user request for vehicle retrieval, the connected VLSS 200 can query a service platform for user profile information of the requesting user (515). The connected VLSS 200 can further identify the platform storing the vehicle associated with the requesting user (520). In addition, the connected VLSS 200 can estimate an ETA of the requesting user at the vehicle lift 250 based on the user's location data (525).

According to embodiments, the connected VLSS 200 can determine a sequence for moving the platforms of the vehicle lift 250 in order to fulfill the user's request for vehicle retrieval (530). If the connected VLSS 200 has other pending user requests for storing or retrieving vehicles, there can be an existing sequence for moving the platforms of the vehicle lift 250. Thus, in response to the requesting user's request, the existing sequence can be updated to include operations to fulfill the requesting user's request. The sequence can be determined or updated based on the current positions of the platforms in the vehicle lift 250 (531), including the identified platform that stores the requesting user's vehicle. The sequence can also be determined based on the user's ETA (532). For instance, the requesting user's ETA can be compared against ETAs of other users who have submitted requests. If the requesting user is estimated to arrive at the vehicle lift 250 earlier than the other users, the requesting user's request for vehicle retrieval can be prioritized to optimize and reduce wait time. On the other hand, if the requesting user is estimated to arrive at the vehicle lift 250 later than other users, the other users' requests can be prioritized over the requesting user's request. The sequence can also be determined or updated based on information contained in the user profile (533). For instance, the user profile can indicate a preferred vehicular access position for retrieving the requesting user's vehicle.

After the sequence is determined or updated, the control system of the VLSS 200 can generate control signal(s) to cause the motor mechanisms of the VLSS 200 to move the platforms of the VLSS 200 in accordance with the determined or updated sequence (535). In addition, the VLSS 200 can transmit, to the requesting user's computing device, an estimated time at which the requesting user's vehicle will be ready for pickup by the requesting user (540). In addition, if the VLSS 200 has multiple vehicular access positions, the VLSS 200 can further transmit to the requesting user's computing device information regarding the vehicular access position (e.g., an exit number, a stall number, etc.) at which the requesting user's vehicle will be placed for pickup by the requesting user.

Figure 6:
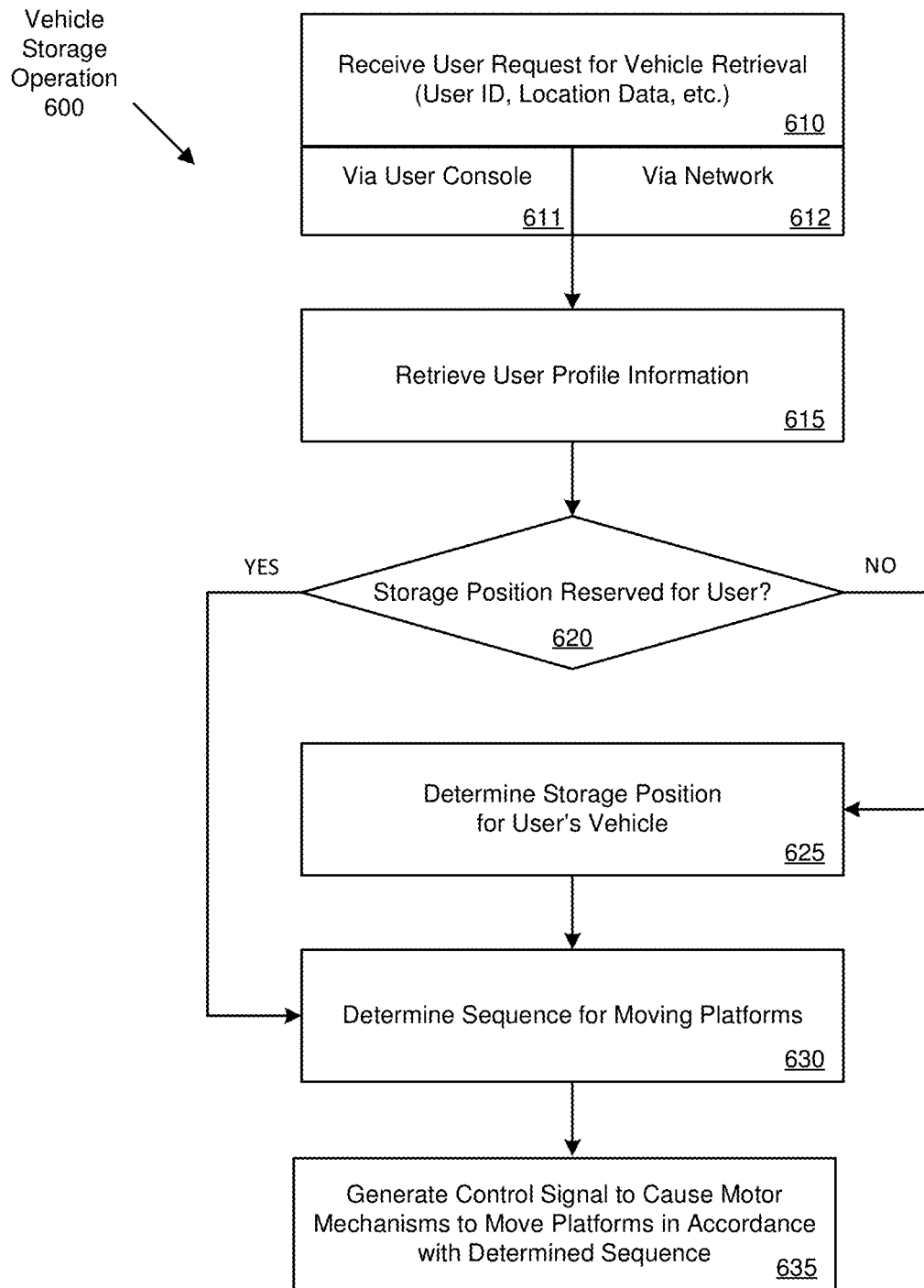
FIG. 6 is a flow chart illustrating an example method of performing a vehicle storage operation, as shown and described herein.

FIG. 6 is a flow chart illustrating an example method of performing a vehicle storage operation, as shown and described herein. In the below discussion of FIG. 6, reference may be made to features and examples shown and described with respect to FIGS. 2A to 2E. For instance, the example method of performing vehicle storage operation 600 can be performed by the connected VLSS 200 of FIG. 2A.

Referring to FIG. 6, the connected VLSS 200 can receive a user request for vehicle storage (610). The user request can include identification information of the user and the user's location data. The user request for vehicle storage can be received from a user console located at or near the connected VLSS 200 (611). The user request for vehicle storage can also be received via one or more networks from a computing device operated by the user (612).

In response to the user request for vehicle storage, the connected VLSS 200 can query a service platform for user profile information of the requesting user (615). Based on the user profile information, the VLSS 200 can determine whether the requesting user has a reserved storage position (620). If the user has a reserved position within the vehicle lift 250, the VLSS 200 can determine a sequence of platform moves to move the vehicle to the reserved position (630). However, if the user does not have a reserved position, the VLSS 200 can determine a storage position for the user's vehicle (625). The storage position can be determined based on a time duration requested as part of the user's request for vehicle storage. For instance, if the requested time duration is short (e.g., less than an hour), the VLSS 200 can determine to move the user's vehicle to a position close to a vehicular access position. On the other hand, if the requested time duration is long, the VLSS 200 can determine to move the vehicle to a storage position that is further away from the vehicular access positions of the VLSS 200 such that other vehicles that will be stored in the VLSS 200 for shorter periods of time can be placed near the vehicular access positions for quick retrieval. In addition, based on the determined position for the user's vehicle, the VLSS 200 can determine or update a sequence of platform movements to move the vehicle into the determined storage position (630). After the sequence is determined or updated, the control system of the VLSS 200 can generate control signal(s) to cause the motor mechanisms of the VLSS 200 to move the platforms of the VLSS 200 in accordance with the determined or updated sequence (635).

Hardware Diagrams

Figure 7:
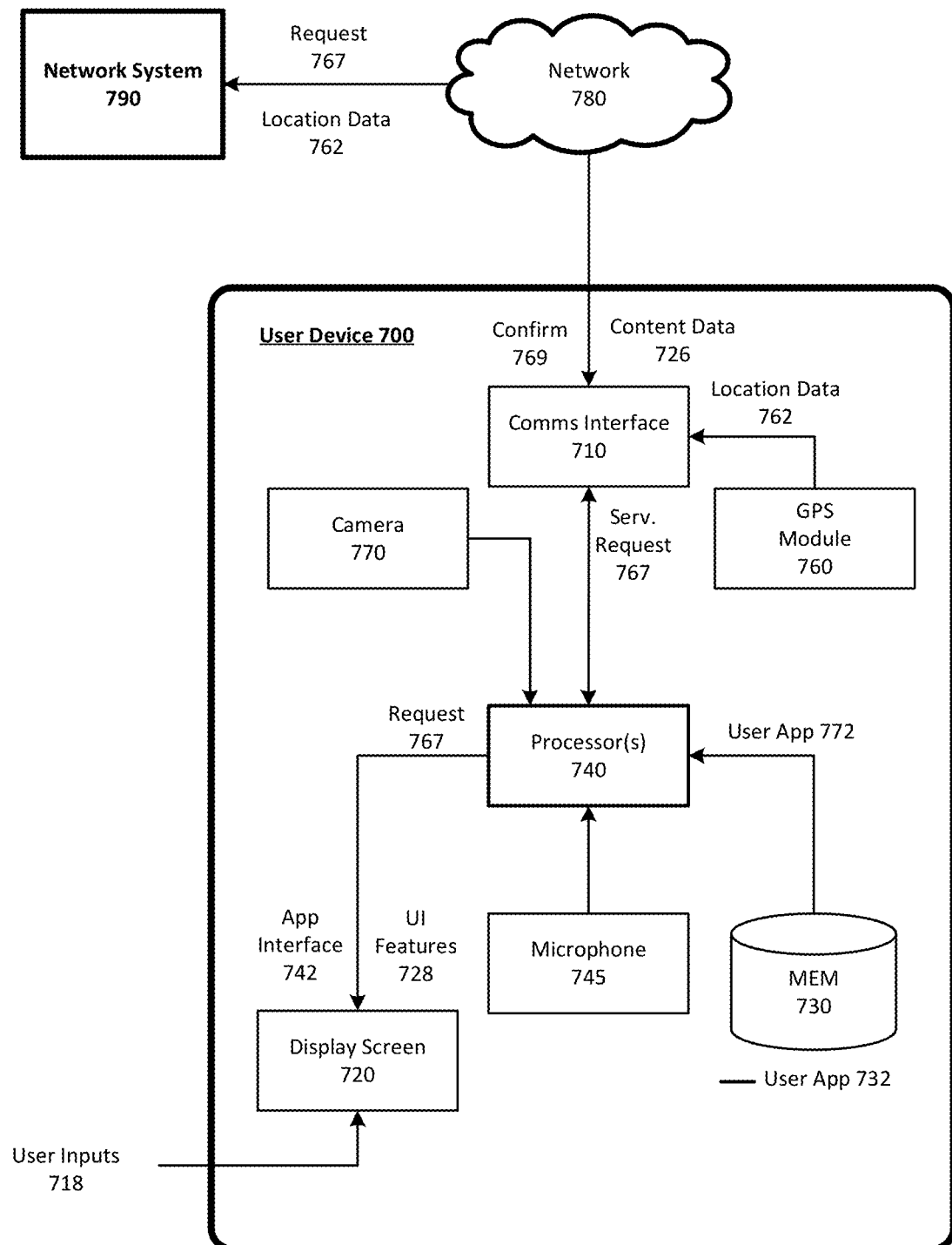
FIG. 7 is a block diagram illustrating an example user device executing and operating a designated user application for communicating with a cloud or network service and/or with a connected VLSS, according to examples described herein.

FIG. 7 is a block diagram illustrating an example user device executing and operating a designated user application for communicating with a cloud or network service and/or with a connected VLSS, according to examples described herein. In many implementations, the user device 700 can comprise a mobile computing device, such as a smartphone, tablet computer, laptop computer, VR or AR headset device, and the like. As such, the user device 700 can include typical telephony features such as a microphone 745, a camera 750, and a communication interface 710 to communicate with external entities using any number of wireless communication protocols. In certain aspects, the user device 700 can store a designated application (e.g., a user app 732) in a local memory 730. In variations, the memory 730 can store additional applications executable by one or more processors 740 of the user device 700, enabling access and interaction with one or more host servers over one or more networks 780.

In response to a user input 718, the user app 732 can be executed by a processor 740, which can cause an app interface 742 to be generated on a display screen 720 of the user device 700. The app interface 742 can enable the user to, for example, enter a request for vehicle storage or a request for vehicle retrieval. In various implementations, the app interface 742 can further enable the user to enter or select one or more locations related to the request (e.g., by entering an address, performing a search, or selecting on an interactive map). Furthermore, the app interface 742 can display dynamically information relating to the request, such as confirmation messages, estimated times of completion, and other information. The user can generate a request 767 via user inputs 718 provided on the app interface 742.

As provided herein, the user application 732 can further enable a communication link with a network system 790 over the network 780, such as the network system 300 as shown and described with respect to FIG. 3. The processor 740 can generate user interface features 728 (e.g., map, request status, etc.) using content data 726 received from the network system 790 over network 780. Furthermore, as discussed herein, the user application 732 can enable the network system 790 to cause the generated user interface 728 to be displayed on the application interface 742.

The processor 740 can transmit the requests 767 via a communications interface 710 to the backend network system 790 over a network 780. In response, the user device 700 can receive a confirmation 769 from the network system 790. In various examples, the user device 700 can further include a GPS module 760, which can provide location data 762 indicating the current location of the requesting user to the network system 790.

Figure 8:
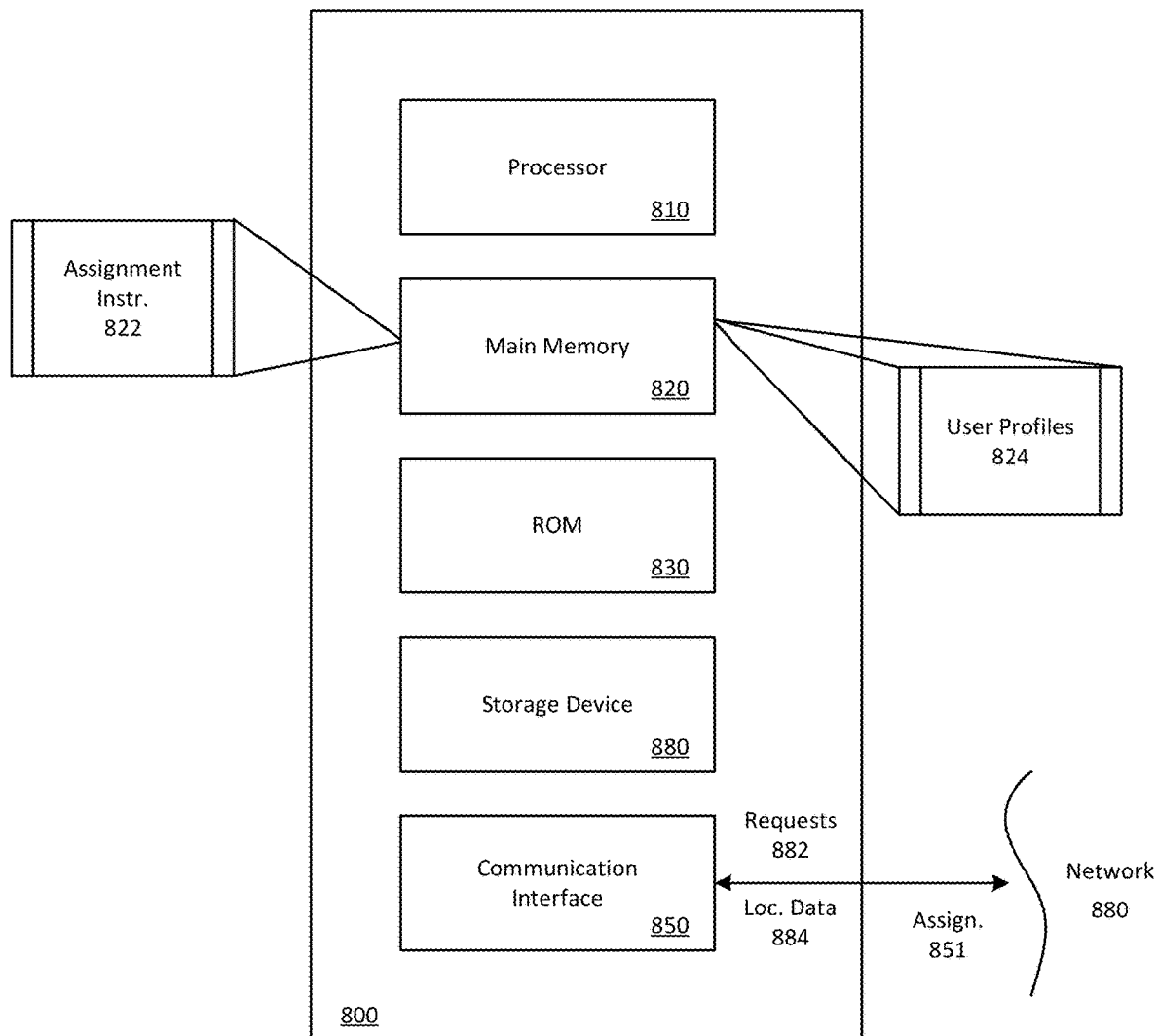
FIG. 8 is a block diagram illustrating a computer system upon which examples described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service managing connected VLSS's. In the context of FIG. 3, the network system 300 may be implemented using a computer system 800 such as described by FIG. 8. The network system 300 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks 880 (e.g., cellular network) through use of the network link (wireless or wired). Using the network link, the computer system 800 can communicate with one or more computing devices, one or more servers, and/or one or more self-driving vehicles. In accordance with examples, the computer system 800 receives requests 882 from computing devices of individual users. The executable instructions stored in the memory 830 can include assignment instructions 822, which the processor 810 executes to determine dynamic parking assignments in response to requests for vehicle storage received from users. In doing so, the computer system 800 can receive location data of the user to determine the dynamic assignment 851 in response to the user request 882. The processor 810 is configured with software and/or other logic to perform one or more processes, steps and other functions described with implementations, such as described by FIGS. 1-7, and elsewhere in the present application.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A vehicle lift and storage system, comprising:
a plurality of platforms for supporting motor vehicles, each of the platforms being movable between a plurality of storage positions and one or more vehicular access positions, the one or more vehicular access positions allowing for vehicular access to the vehicle lift and storage system;
one or more moving mechanisms operatively coupled to the plurality of platforms to move the platforms between the plurality of storage positions and the one or more vehicular access positions;
a control system for controlling the vehicle lift and storage system, the control system including a network interface for communicating over one or more networks and being configured to:
receive, over the one or more networks from a first user device associated with a first user of the vehicle lift and storage system, user data associated with the first user, the user data comprising a first set of location data generated by the first user device and identification information of the first user;
determine, based on the first set of location data generated by the first user device, a first estimated time of arrival of the first user at the vehicle lift and storage system;
based on the identification information of the first user received from the first user device, identify, among the plurality of platforms, a platform on which a vehicle associated with the first user is located; and
based on a position of the identified platform and the first estimated time of arrival of the first user at the vehicle lift and storage system, update a sequence for moving the plurality of platforms to include steps for moving the identified platform to one of the one or more vehicular access positions.

2. The vehicle lift and storage system of claim 1, wherein the control system is further configured to generate control signals for the one or more moving mechanisms to move the plurality of platforms in accordance with the updated sequence.

3. The vehicle lift and storage system of claim 1, wherein updating the sequence for moving the plurality of platforms is based further on a second estimated time of arrival of a second user of the vehicle lift and storage system, the second estimated time of arrival of the second user being determined based on a second set of location data received from a second user device associated with the second user.

4. The vehicle lift and storage system of claim 3, wherein updating the sequence for moving the plurality of platforms is based, at least in part, on comparing the first estimated time of arrival of the first user with the second estimated time of arrival of the second user.

5. The vehicle lift and storage system of claim 3, wherein updating the sequence for moving the plurality of platforms is based, at least in part, on performing a multi-variate optimization based on the first estimated time of arrival of the first user and the second estimated time of arrival of the second user.

6. The vehicle lift and storage system of claim 1, wherein the control system is further configured to update the sequence for moving the plurality of platforms based on user profile information of the first user indicating a preferred vehicular access position of the first user.

7. The vehicle lift and storage system of claim 1, wherein the control system is further configured to update the sequence for moving the plurality of platforms based on user profile information of the first user indicating historical usage information of the first user pertaining to the vehicle and lift storage system.

8. The vehicle lift and storage system of claim 1, wherein the control system is further configured to maintain data records regarding operations of the vehicle lift and storage system, including at least respective cycle counts for each of the one or more moving mechanisms.

9. The vehicle lift and storage system of claim 8, wherein the control system is further configured to, in response to determining that a respective cycle count for one of the one or more moving mechanisms exceeds a threshold value, generating a maintenance message to one or more of: (i) a computing system or a computing device of a system administrator of the vehicle lift and storage system, (ii) a network server for managing one or more aspects of the vehicle lift and storage system, or (iii) a cloud service for managing one or more aspects of the vehicle lift and storage system.

10. The vehicle lift and storage system of claim 1, wherein the control system is further configured to:
receive camera data from one or more cameras positioned to capture images or videos of the one or more vehicular access positions, including a first vehicle on a first platform that is in a first vehicular access position of the one or more vehicular access positions;
detect a safety event associated with the first vehicle based on the received camera data;
in response to detecting the safety event, generate a safety event signal for the one or more moving mechanisms to cause the first platform to remain in the first vehicular access position.

11. The vehicle lift and storage system of claim 10, wherein detecting for safety events based on the received camera data comprises determining, based on the received camera data, that: (i) a person is in the first vehicle, or (ii) a door of the first vehicle is open.

12. The vehicle lift and storage system of claim 10, wherein the control system is further configured to, in response to detecting the safety event associated with the first vehicle, further updating the sequence for moving the plurality of platforms such that a second platform of the plurality of platforms is moved while the first platform remains in place in the first vehicular access position in response to the safety event signal.

13. The vehicle lift and storage system of claim 1, wherein the control system is further configured to determine whether the vehicle associated with the first user is capable of performing autonomous driving operations in response to instructions transmitted by the control system.

14. The vehicle lift and storage system of claim 13, wherein the control system is further configured to, in response to determining that the vehicle associated with the first user is capable of performing autonomous driving operations in response to instructions transmitted by the control system, transmitting instructions to the vehicle associated with the first user after the identified platform is in position at the one of the one or more vehicular access positions to cause the vehicle associated with the first user to drive from the identified platform to a waiting area.

15. The vehicle lift and storage system of claim 1, wherein the control system is further configured to determine, based on the updated sequence, an estimated time of completion at which the identified platform will be moved to the one of the one or more vehicular access positions, and cause a notification message to be transmitted to the first user device of the first user, the notification message including information regarding the estimated time of completion.

16. The vehicle lift and storage system of claim 15, wherein the notification message further includes information regarding the one of the one or more vehicular access positions, including a stall number.

17. The vehicle lift and storage system of claim 1, wherein updating the sequence for moving the plurality of platforms is based further on a second set of location data transmitted by a second user device of a second user of the vehicle lift and storage system.

18. A computer-implemented method of operating a vehicle lift and storage system, the method being performed by a control system of the vehicle lift and storage system and comprising:
receiving, via a network interface over one or more networks from a user device associated with a first user of the vehicle lift and storage system, user data associated with first the user comprising a set of location data generated by the user device and identification information of the first user;
determining, based on the set of location data generated by the first user device, a first estimated time of arrival of the first user at the vehicle lift and storage system;
based on the identification information of the first user received from the user device, identifying, among a plurality of platforms of the vehicle lift and storage system, a platform on which a vehicle associated with the first user is located, wherein each of the plurality of platforms is movable between a plurality of storage positions and one or more vehicular access positions, the one or more vehicular access positions allowing for vehicular access to the vehicle lift and storage system;
based on a position of the identified platform and the first estimated time of arrival of the first user at the vehicle lift and storage system by the first user device, updating a sequence for moving the plurality of platforms to include steps for moving the identified platform to one of the one or more vehicular access positions; and
generating control signals for one or more moving mechanisms of the vehicle lift and storage system to move the plurality of platforms in accordance with the updated sequence, the one or more moving mechanisms being operatively coupled to the plurality of platforms to move the platforms between the plurality of storage positions and the one or more vehicular access positions.

19. The computer-implemented method of claim 18, wherein updating the sequence for moving the plurality of platforms is based further on comparing the first estimated time of arrival of the first user with a second estimated time of arrival of a second user of the vehicle lift and storage system, the second estimated time of arrival of the second user being determined based on a second set of location data received from a second user device associated with the second user.

20. A non-transitory computer-readable medium storing instructions that, when executed by one or more processors of a control system of a vehicle lift and storage system, cause the control system to:

receive, via a network interface over one or more networks from a user device associated with a user of the vehicle lift and storage system, user data associated with the user comprising a set of location data generated by the user device and identification information of the user;

determine, based on the set of location data generated by the user device, an estimated time of arrival of the user at the vehicle lift and storage system;

based on the identification information of the user received from the user device, identify, among a plurality of platforms of the vehicle lift and storage system, a platform on which a vehicle associated with the user is located, wherein each of the plurality of platforms is movable between a plurality of storage positions and one or more vehicular access positions, the one or more vehicular access positions allowing for vehicular access to the vehicle lift and storage system;

based on a position of the identified platform and the estimated time of arrival of the user at the vehicle lift and storage system, update a sequence for moving the plurality of platforms to include steps for moving the identified platform to one of the one or more vehicular access positions; and generate control signals for one or more moving mechanisms of the vehicle lift and storage system to move the plurality of platforms in accordance with the updated sequence, the one or more moving mechanisms being operatively coupled to the plurality of platforms to move the platforms between the plurality of storage positions and the one or more vehicular access positions.

* * * * *